US012003600B2

(12) United States Patent
Pilkauskas et al.

(10) Patent No.: US 12,003,600 B2
(45) Date of Patent: Jun. 4, 2024

(54) NETWORK COORDINATION BETWEEN PROXY SERVERS

(71) Applicant: Oxylabs, UAB, Vilnius (LT)

(72) Inventors: Valdas Pilkauskas, Vilnius (LT); Miroslav Kozlovski, Vilnius (LT)

(73) Assignee: OXYLABS, UAB, Vilnius (LT)

( * ) Notice: Subject to any disclaimer, the term of this patent is extended or adjusted under 35 U.S.C. 154(b) by 0 days.

(21) Appl. No.: 17/845,240

(22) Filed: Jun. 21, 2022

(65) Prior Publication Data

US 2023/0412701 A1 Dec. 21, 2023

(51) Int. Cl.
*G06F 15/16* (2006.01)
*H04L 61/4511* (2022.01)
*H04L 61/5007* (2022.01)
*H04L 67/56* (2022.01)
*H04L 101/618* (2022.01)

(52) U.S. Cl.
CPC .......... *H04L 67/56* (2022.05); *H04L 61/4511* (2022.05); *H04L 61/5007* (2022.05); *H04L 2101/618* (2022.05)

(58) Field of Classification Search
CPC . H04L 67/56; H04L 61/5007; H04L 61/4511; H04L 2101/618
USPC ........................................................ 709/217
See application file for complete search history.

(56) References Cited

U.S. PATENT DOCUMENTS

| 6,823,377 | B1 * | 11/2004 | Wu ....................... H04L 67/289 709/215 |
| 8,547,962 | B2 | 10/2013 | Ramachandran et al. |
| 8,612,564 | B2 | 12/2013 | Swildens et al. |

(Continued)

FOREIGN PATENT DOCUMENTS

| EP | 2112788 A1 | 10/2008 |
| KR | 2014-0035385 A | 3/2014 |
| WO | WO 2008/116401 A1 | 10/2008 |

*Primary Examiner* — Alicia Baturay
(74) *Attorney, Agent, or Firm* — Sterne, Kessler, Goldstein & Fox P.L.L.C.

(57) ABSTRACT

Systems and methods for coordinating network connectivity and communication between proxy servers, exit-nodes and client modules are disclosed. In one aspect, the proxy infrastructure enables network connectivity between exit-nodes and proxy-nodes without the need of any proxy-gateways or middleware entities to delegate the connections. Proxy-nodes in the proxy infrastructure accept connections with exit-nodes based on geographical proximity, proxy-node metrics, such as server loads and clients' frequent preferences. Further, a single instance of proxy-node can communicate and instruct another instance of proxy-node, to service the client request via a suitable exit-node. Further still, a single instance of proxy-node can communicate and instruct another instance of proxy-node to redirect a suitable exit-node towards the first proxy-node in order to service the client request. In another instance, the proxy-infrastructure enables client modules to connect to proxy-nodes based on geographical proximity, client parameters, and client's behavioral informatics. In yet another aspect, proxy infrastructure enables a proxy node to redirect exit-nodes to a different proxy—node in the event of a) system overload or resource exhaustion, b) graceful shutdown c) erroneous network connection between exit-nodes and the proxy-node.

23 Claims, 16 Drawing Sheets

(56) References Cited

U.S. PATENT DOCUMENTS

| | | |
|---|---|---|
| 9,137,131 B1 | 9/2015 | Sarukkai et al. |
| 9,154,557 B2 | 10/2015 | Lev-Ran et al. |
| 9,565,157 B2 | 2/2017 | Chhabra et al. |
| 9,697,173 B2 * | 7/2017 | Weaver ............... H04L 61/4511 |
| 9,906,436 B2 * | 2/2018 | Westphal ................ H04L 45/64 |
| 10,284,516 B2 | 5/2019 | Connell et al. |
| 10,873,647 B1 | 12/2020 | Pilkauskas et al. |
| 10,902,080 B2 | 1/2021 | Shribman et al. |
| 10,965,770 B1 | 3/2021 | Vilcinskas et al. |
| 10,985,934 B2 | 4/2021 | Shribman et al. |
| 11,057,351 B1 | 7/2021 | Simanel et al. |
| 11,057,446 B2 | 7/2021 | Shribman et al. |
| 11,165,879 B2 | 11/2021 | Power et al. |
| 11,212,354 B1 | 12/2021 | Pilkauskas et al. |
| 11,290,548 B2 | 3/2022 | Ppallan et al. |
| 11,297,152 B1 * | 4/2022 | Stalioraitis .............. H04L 47/22 |
| 11,381,666 B1 * | 7/2022 | Stalioraitis .............. H04L 67/01 |
| 11,463,400 B2 * | 10/2022 | Joffe ....................... H04L 61/59 |
| 11,496,594 B1 * | 11/2022 | Stalioraitis ........... H04L 47/827 |
| 11,632,436 B1 * | 4/2023 | Stalioraitis ............. H04L 67/52 |
| | | 709/223 |
| 2012/0159623 A1 | 6/2012 | Choi |
| 2012/0209942 A1 | 8/2012 | Zehavi et al. |
| 2013/0254333 A1 | 9/2013 | Lyon |
| 2016/0094645 A1 | 3/2016 | Ashutosh et al. |
| 2018/0212835 A1 | 7/2018 | Chen et al. |
| 2018/0219970 A1 | 8/2018 | Shribman et al. |
| 2019/0182359 A1 | 6/2019 | Shribman et al. |
| 2023/0102361 A1 * | 3/2023 | Joffe ................... H04L 61/4552 |
| | | 709/245 |

* cited by examiner

NETWORK COORDINATION BETWEEN PROXY SERVERS

FIELD

The disclosure belongs to the field of proxy servers and proxy technology. Methods and systems disclosed herein are, in general, directed to implement several strategies for network coordination in a diverse proxy infrastructure.

BACKGROUND

In recent times, there has been a surge to enhance the privacy of internet users, especially by developing network services based on privacy-enhancing infrastructures. Safeguarding internet users' privacy has always been an important concern in almost every technology and business globally, and users are offered several solutions to safeguard their privacy. For instance, proxy servers can be considered one of the efficient solutions for internet users to enhance their privacy by obfuscating their actual Internet Protocol (IP) address online. 131 Proxy servers, or proxies, act as intermediary network nodes for delivering network communications between users and internet services (remote servers). Users can send their network traffic (e.g., web requests) to the remote servers via proxy servers. When a proxy server receives a request from a user or a client for a particular resource, the proxy server first searches the internal cache for the requested resource and returns it to the user if the requested resource is found in the internal cache. However, if the requested resource is not found in the internal cache, the proxy server forwards the user's request to the particular remote server (e.g., web server) to acquire the requested resource. Eventually, the proxy server receives the requested resource from the remote server and forwards it back to the user. The caching operation of proxies reduces the need for direct communication between users and remote servers, which leads to the prevention of network bottlenecks. Moreover, by sending and receiving network traffic through a proxy, users can avoid revealing their IP addresses to the remote servers.

Besides safeguarding the privacy of internet users, proxies can also be used to avoid internet censorship. Users on the internet may be censored by internet providers and/or governments in certain parts of the world. In such instances, proxy servers can be a suitable solution to circumvent government censorship and retrieve or access information on the internet. Rather than accessing the censored website directly, accessing it through a proxy server situated in another country makes users less likely to be found by internet censors.

Proxies are commonly classified based on two categories: a) based on routing pattern; b) based on operational protocol. On the basis of routing pattern, proxies are further classified into the following: i) forward proxies—these proxies are proxy servers that route traffic between the client(s) and another system, usually external to the network. By doing so, forward proxies can regulate traffic according to preset policies, convert and mask client IP addresses, enforce security protocols and block unknown traffic. Systems with shared networks, such as business organizations or datacenters, often use forward proxy servers. It should be mentioned that forward proxies expose a single interface with which clients interact without enforcing all of the policies and route management logic within the clients themselves. ii) reverse proxies—a reverse proxy is a proxy server that accepts requests from clients, forwards the requests to another one of many servers, and returns the result from the server that actually processed the request to the client. A forward proxy server allows multiple clients to route traffic to an external network. For instance, a business may have a proxy that routes and filters employees' traffic to the public internet. On the other hand, a reverse proxy routes traffic on behalf of multiple servers. Moreover, a reverse proxy effectively serves as a gateway between clients, users and application servers. It handles all the access policy management and traffic routing, and it protects the server's identity that actually processes the client's request.

Proxies can also be classified based on their IP addresses—residential, datacenter, mobile and ISP proxies. A residential proxy is an IP address from the range designated explicitly by the owning party assigned to private customers. Usually, a residential proxy is an IP address linked to a physical device, for example, a mobile phone or desktop computer. However, businesswise, the blocks of residential IP addresses may be bought from the owning Proxy Service Provider by another company directly, in bulk. The real owners of the residential IP address ranges, namely internet service providers (ISPs), register residential IP addresses in public databases, allowing websites to determine a device's internet provider, network, and location. Residential proxies are broadly categorized into two subdivisions—static residential proxies and rotating residential proxies. Static residential proxies mask clients' actual IP addresses behind a single IP address. On the contrary, rotating residential proxies mask clients' actual IP addresses behind a pool of IP addresses that constantly rotates or changes over time. IP addresses of the rotating residential proxies may belong to different subnets connected with an advanced global IP address network. Most data collection businesses prefer rotating residential proxies over static residential proxies.

Following the residential proxies, datacenter proxies are IP addresses owned by Local Internet Registries (LIRs) such as, but not limited to, web hosting companies and universities. Datacenter proxies are not affiliated with any Internet Service Providers (ISPs). In general, datacenter proxies are known for their exceptional performance, speed and cost-effectiveness. One of the differences between residential and datacenter proxies is that the latter are owned by companies or organizations and not by individuals. Datacenter proxies may be subdivided into private datacenter proxies, public data-center proxies, and shared data center proxies. Private datacenter proxies, also known as dedicated datacenter proxies, are IP addresses employed in a specific timeframe or a particular domain. Dedicated datacenter proxies are extremely useful in online data collection operations. Public datacenter proxies are generally free proxies useful only for fundamental requirements like disguising a client's geo-location to circumvent geo-restriction over the internet. Likewise, shared datacenter proxies are usually shared by several individuals or companies simultaneously. Small businesses with financial constraints may employ shared datacenter proxies.

Mobile proxy servers are another type of proxy server classified based on IP addresses. Mobile proxies are IP addresses with network connections assigned to clients by mobile carriers. Mobile proxies are available on portable devices like smartphones or tablets with internet connections through mobile data. Yet another type of proxy server is the ISP proxy server. The ISP proxy servers are proxies with both residential and datacenter attributes. ISP proxies are supported by an ISP to assign an IP address to the client but are hosted on a datacenter's servers. ISP proxies are configured to aid clients with multiple use cases like residential proxies without compromising performances like datacenter proxies.

Exit node proxies, or simply exit nodes, are proxies, and through these proxies, the request from the user (or the entry node) reaches the internet. There can be several proxies used to perform a user's request, but the exit node proxy is the final proxy that contacts the target, procures the necessary information and forwards the procured information to several other proxies and/or gateways which ultimately delivers the procured information to the user. In the current embodiments, proxies and exit nodes can be used as synonyms. The current embodiments are not limited only to the exit nodes and the same technologies can be used for the proxies. However, the term exit node is employed in the current description to clarify the technical differences between exit nodes and proxies. Inherently the exit node device is external to the proxy service provider infrastructure, usually belonging to a private customer e.g. a smartphone, a computer, a TV, or another internet-enabled electronic device.

Having described the fundamentals of proxy servers, it is important to understand that there can be significant challenges associated with proxies and proxy services. Not every proxy service provider can offer reliable and efficient proxy services. Maintaining and administering a diverse range of proxy services can be an arduous undertaking. Proxy service providers may in certain circumstances, require immense technological expertise and innovations to deploy successful proxy service to their multitudinous clients from around the world. Furthermore, proxy service providers may need technological improvement to meet varied demands and requirements of their clients. For example, proxy service providers must be able to offer proxies with high availability and minimal response latency.

Therefore, the embodiments of the current disclosure aim to provide solutions and improvements to better the implementation of a globally distributed proxy service. Especially, the present embodiments provide at least the following solution: a) ways to reduce the hop count between a proxy client and a proxy server present within a proxy infrastructure; b) ways to reduce the hop count between several proxy servers; c) ways to alleviate system overloading among proxy servers and d) ways to optimize proxy services based on clients preferences and demands. Overall, the embodiments of the current disclosure ensure means to improve network throughput, reduce latency, and coordinate communications between several proxy servers thereby improving the performance of a proxy infrastructure as a whole.

A person of ordinary skills in the art will appreciate that the discussion above is merely provided for general background information and is not intended to define or categorize the scope of the claimed subject matter.

SUMMARY

The summary provided herein presents a general understanding of the exemplary embodiments disclosed in the detailed description accompanied by drawings. Moreover, this summary is not intended as an extensive or exhaustive overview. Instead, the only purpose of this summary is to present the condensed concepts related to the exemplary embodiments in a simplified form as a prelude to the detailed description.

System and methods for governing a globally distributed proxy service infrastructure are disclosed herein. The embodiments disclosed herein provide methods and systems to coordinate network connections between exit-nodes and proxy-nodes. Specifically, an exit-node is enabled to directly request a network connection from a proxy-node based on geographical proximity, proxy-node metrics and clients' frequent preferences. The embodiments eliminate the need for proxy-gateways or middleware entities to delegate network connections between exit-nodes and proxy-nodes. Furthermore, the embodiments disclosed herein provide methods and systems to coordinate network communications between exit-nodes and proxy-nodes. Specifically, a proxy-node is enabled to redirect exit-nodes to connect to alternate proxy-nodes in case of system overload or resource exhaustion, graceful shutdown and erroneous network connections.

Furthermore, the embodiments disclosed herein provide methods and systems to coordinate network connections between client modules and proxy-nodes. Specifically, a client module is enabled to directly connect to a proxy-node based on geographical proximity, client's prerequisites and regular activities of the particular client. The embodiments eliminate the need for proxy-gateways or middleware entities to delegate network connections between client modules and proxy-nodes. Further still, the embodiments disclosed herein provide methods and systems to coordinate network communications between several proxy-nodes for the purpose of servicing the client requests efficiently. Specifically, a proxy-node is enabled to communicate with a subsequent proxy-node that holds a network connection with an exit-node desired by the client and can a) instruct the subsequent proxy-node to service the client request via the desired exit-node and b) instruct the subsequent proxy-node to redirect the desired exit-node towards it (i.e., the proxy-node) for the sake of servicing the client request.

BRIEF DESCRIPTION OF DIAGRAMS

DETAILED DESCRIPTION

Figure 1:
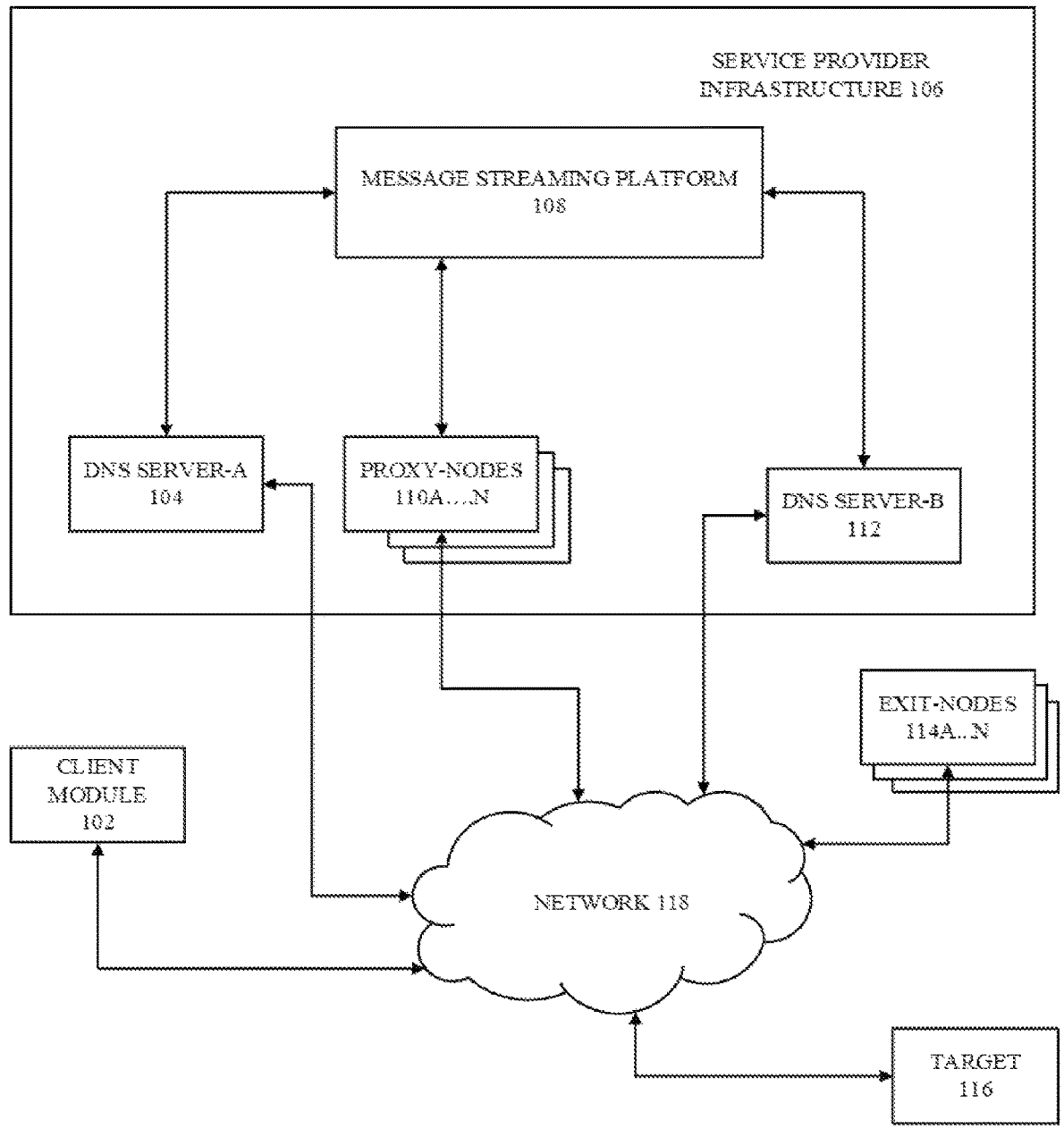
FIG. 1 illustrates an architectural block diagram of several exemplary embodiments disclosed herein.

The following detailed description is provided below along with accompanying figures to illustrate the core aspects of the embodiments disclosed herein. While one or more aspects of the embodiments are described, it should be understood that the described aspects are not limited to any one embodiment. On the contrary, the scope of the present embodiments are only limited by the claims and furthermore, the disclosed embodiments may encompass numerous alternatives, modifications and equivalents. For the purpose of example, several details are described in the following description in order to give a comprehensive understanding of the present embodiments. A person of ordinary skills in the art will understand that the described embodiments may be implemented or practiced according to the claims without some or all of these specific details. In addition, standard or well-known methods, procedures, components and/or systems have not been described in detail so as not to obscure the crucial parts of the disclosed exemplary embodiments.

The term "one embodiment", "an embodiment", "an exemplary embodiment" etc., as used in the current disclosure, imply that the embodiment described may comprise a particular aspect, attribute, or feature, but every embodiment may not necessarily comprise the particular aspect, attribute, or feature. In addition, such terms are not necessarily implying the same embodiment. Furthermore, when a particular aspect, attribute or feature is disclosed in association with an embodiment, it is suggested that it is within the knowledge of one skilled in the art to affect such aspect, attribute or feature in association with other embodiments whether or not explicitly disclosed.

Some general terminology descriptions may be helpful and are included herein for convenience and are intended to be interpreted in the broadest possible interpretation. Elements or entities that are not imperatively defined in the description should have the meaning as would be understood by a person skilled in the art.

In the embodiments of the current disclosure, client module 102 may be any computing resources or any computing architecture including, but not limited to, a computer device, a personal computer, a laptop computer, a smartphone, a tablet computer, a palm-top computer device, portable media players, GPS units, an E-reader, a gaming device, a digital camcorder, a handheld gaming device, a digital camera, a Wi-Fi speaker, a vehicle infotainment device, an intelligent appliance (e.g., smart refrigerator or smart television), a cloud server, a mainframe, a storage device, a desktop, a workstation, a mobile device, a virtual assistance device, an intelligent printer, or any other electronic device used for requesting resources and/or services from one or more targets over a network. In some instances, the client module 102 may send resources and/or services to one or more targets over a network. Besides, a person having ordinary skill in the art will understand that the term "client" is being used in the interest of brevity and may refer to any of a variety of entities responsible for owning and/or operating and/or administering client module 102. Furthermore, the aforesaid variety of entities may be associated with a subscriber account such as, for example, a person, an organization, an organizational role within an organization and/or a group within an organization.

DNS server-A 104 can be a collection of resources and/or computing platforms and/or servers that offer services to one or more client modules 102, including domain name resolution services (i.e., DNS services). DNS server-A 104 may operate and provision domain name servers, which are employed and integrated with other resources/services, including, for example, domain name registrars, web hosting services and Internet Service Providers (ISPs). DNS server-A 104 may offer static and dynamic DNS services to one or more client modules 102. DNS server-A 104 may comprise memory spaces and/or access to exclusive storage facilities. Furthermore, DNS server-A 104 may access message streaming platform 108 and fetch a plurality of messages. The fetched message may include but not limited to exit-node metadata and proxy-node metadata. The fetched messages may be saved in the memory spaces and/or in the storage facilities of DNS server-A 104. In the current disclosure, DNS server-A 104 may receive DNS queries from one or more client modules 102 and may answer the DNS queries according to several policies, which are described in greater detail in the later sections of the current disclosure. Furthermore, in the current disclosure, DNS server-A 104 is one of the many network entities/resources present within service provider infrastructure 106.

Service provider infrastructure 106 (SPI 106) may be a combination of resources and/or entities distributed across several geo-locations comprising the infrastructure that offers proxy services to one or more client modules 102 around the globe. In some embodiments, SPI 106 may comprise or be based on cloud computing infrastructures. In the current embodiments, SPI 106 may comprise but is not limited to DNS server-A 104, message streaming platform 108, proxy-nodes 110A . . . N, DNS server-B 112, and exit-nodes 114A . . . N. As mentioned above, SPI 106 may comprise other standard entities or combinations of resources and/or entities necessary for executing proxy services.

Message streaming platform 108 may be a distributed and durable computing platform that acts as a message bus, but optimized for high-ingress data streams and replay. Furthermore, message streaming platform 108 may provide real-time message streaming pipelines and applications that can adapt to live data streams. In short, message streaming platform 108 provides seamless data exchange between several entities and/or resources of SPI 106 without obstructing the operations of the aforementioned entities/resources. Message streaming platform 108 may comprise, among other things, a plurality of internal sections or partitions reserved for multiple types of data streams or messages. In the current embodiments, message streaming platform 108 is one of the network entities/resources present within SPI 106.

Proxy-node(s) (represented by proxy-nodes 110A . . . N) may be a proxy server and/or a collection of computing platforms capable of, for example, processing, analyzing, evaluating, managing and routing vast amounts of data and network traffic. In addition, proxy-nodes may oversee, communicate, and access, in certain instances, supervise several network entities of SPI 106 (e.g., exit-nodes 114A . . . N). Proxy-nodes may accept network connections and receive network traffic from one or more client modules 102 via network 118. Further, proxy-nodes may relay the network traffic received from one or more client modules 102 to appropriate exit-nodes 114A . . . N. Likewise, proxy-nodes may accept network connections and receive network traffic from exit-nodes 114A . . . N in response to the network traffic originating from one or more client modules 102. Further, proxy-nodes may relay the network traffic received from exit-nodes 114A . . . N to appropriate one or more client modules 102 via network 114. In the current embodiments, proxy-nodes are among the many network entities/resources present within SPI 106. There can be multiple proxy-nodes present within SPI 106, and an administrator of SPI 106 may determine the exact number of proxy-nodes. Moreover, proxy-nodes are distributed and situated across numerous geo-locations across the globe. In some embodiments, proxy-nodes may be a cloud server. Further still, proxy-nodes may communicate or exchange network traffic among themselves, i.e., a single instance or proxy-node may communicate or exchange network traffic with another one or more instances of proxy-node within SPI 104 irrespective of their geo-locations. In addition, proxy-nodes may transmit messages/data to message streaming platform 112 and also fetch messages/data from message streaming platform 112 (e.g., proxy-node metadata, proxy-node metrics, and exit-node metrics).

DNS server-B 112 can be a collection of resources and/or computing platforms and/or servers that offers services to exit-nodes 112A . . . N, including domain name resolution service (i.e., DNS services).DNS server-B 112, similar to DNS server-A 104 may operate and provision domain name servers, which are employed and integrated with other resources/services, including, for example, domain name registrars, web hosting services and Internet Service Providers (ISPs). DNS server-B 112 may offer static and dynamic DNS services to exit-nodes 114A . . . N. DNS server-B 112 may comprise memory spaces and/or access to exclusive storage facilities. Furthermore, DNS server-B 112 may access message streaming platform 108 and fetch a plurality of messages including but not limited to exit-node metadata, proxy-node metadata and proxy-node metrics. The fetched messages may be saved in the memory spaces and/or in the storage facilities of DNS server-B 112. In the current disclosure, DNS server-B 112 may answer DNS queries from exit-nodes 114A . . . N. DNS server-B may answer to the DNS queries from exit-nodes based on several policies which are detailed in the later sections of the current disclosure. Furthermore, in the current disclosure, DNS server-B 112 is one of the many network entities/resources present within service provider infrastructure 106.

Exit-node(s) (represented by exit-nodes 114A . . . N) can be any instance of a computing system/device or an edge proxy server connected to or in communication with at least one proxy-node present within the service provider infrastructure 106. Exit-nodes 114A . . . N can receive and forward network traffic from at least one proxy-node to a plurality of target servers 116 via network 118. In the same context, exit-nodes 114A . . . N can receive and forward response traffic from the plurality of target servers 116 to at least one proxy-node. Exit-nodes 114A . . . N may be situated across numerous geo-locations across the globe. In some instances, exit-nodes 114A. . . N may be cloud servers. In the current embodiments, exit-nodes 114A . . . N may approach multiple proxy-nodes and establish network connections with them.

Target 116 may be an instance of a server serving resources or other services (e.g., media contents, data, educational information etc.) over the network 118. Target 116 can be identified and accessed by, for example, a particular IP address, a domain name, and/or hostname, possibly with a defined network protocol port. Target 116 may be a remote system serving data or services accessible through standard network protocols. Also, Target 124 may be a physical or a cloud server.

Network 118 can be any digital telecommunication network that allows nodes to share and access resources. Examples of a network: local-area networks (LANs), wide-area networks (WANs), campus-area networks (CANs), metropolitan-area networks (MANs), home-area networks (HANs), intranet, extranet, internetwork, and internet.

In the current disclosure, proxy-node metrics may be a collection of quantifiable performance indicators that indicate the status and performance levels of a proxy-node. Proxy-node metrics may comprise, but not limited to system load, resource exhaustion level, request per second (RPS), uptime, error rates, thread count, average response time (ART), peak response time (PRT) and security-level and active status.

Proxy-node metadata may be a set of specifications that define various properties and features of a proxy-node. In some embodiments, proxy-node metadata may also be known as proxy-node attribute. Proxy-node metadata may comprise but not limited to IP address, unique identifier (unique ID), geo-location, total number of connected exit-nodes, IP addresses of the connected exit-nodes and other relevant information pertaining to the proxy-node.

Similarly, exit-node metadata may be a set of specifications that define various properties and features of an exit-node. In some embodiments, exit-node metadata may also be known as exit-node attribute. Exit-node metadata may comprise but not limited to IP addresses, unique identifies, (unique ID), geo-locations, total number of connected proxy-nodes, IP addresses of the connected proxy-nodes and other relevant information pertaining to the exit-node.

FIG. 1 illustrates an architectural block diagram of several exemplary embodiments disclosed herein. Particularly, FIG. 1 illustrates a single exemplary instance of a client module 102, a service provider infrastructure 106, exit-nodes 114A . . . N, a target and network 118. Service provider infrastructure 106 comprises a DNS server-A 104, proxy nodes 110A. . . N, a DNS server-B 112, a message streaming platform 108. In some embodiments, DNS server-A 104 and DNS server-B 112 may exist as a single entity within proxy service provider infrastructure 106.

A person of ordinary skill in the art must appreciate that service provider infrastructure 106 may comprise other resources and/or entities necessary to process and route network traffic from clients via appropriate proxy-servers to several target servers. Moreover, in some embodiments, DNS server-B 112 and DNS server-A 104 may be combined as a single entity servicing both client modules 102 and exit nodes 114A . . . N.

The entities and/or resources illustrated in FIG. 1 implement the exemplary embodiments of the current disclosure; however, in some embodiments, the entities and/or resources may have different titles or be combined into a single element instead of two separate entities and/or resources. Such combinations or arrangements may not affect or alter the functionalities of elements and the flow of information between entities and/or resources. Therefore, FIG. 1, as shown, should be interpreted as exemplary only and not restrictive or exclusionary of other features, including features discussed in other areas of this disclosure.

In FIG. 1, network 118 can be local area networks (LANs), wide-area networks (WANs), campus-area networks (CANs), metropolitan-area networks (MANs), home-area networks (HANs), intranet, extranet, internetwork, and internet. However, the internet is the most relevant network for the functioning of the present embodiment. Connection to network 118 may require that client module 102, DNS server-A 104, proxy-nodes 110A . . . N, exit-nodes 114A . . . N, message streaming platform 108 and target 116 to execute software routines that support implementation of, for example, but not limited to, TCP/IP communications.

In FIG. 1, an exit-node seeking a network connection with at least one of several proxy-nodes present within SPI 106 may first submit a DNS query to DNS server-B 112. In some embodiments of FIG. 1, DNS server-B 112 may be configured to answer the DNS query based on the exit-node's geo-location. After receiving the DNS query, DNS server-B 112 may perform a DNS name resolution process by searching through its internal resources and/or domain name servers to select one of several proxy-nodes whose geo-location is closer or identical to the exit-node's geo-location. Generally, a DNS query may comprise but not be limited to a query domain name, query type and query class. Also, a person of ordinary skill in the art may understand that DNS server-B 112 may ascertain the exit-node's geo-location based on its IP address.

After selecting one of several proxy-nodes whose geo-location is closer or identical to the exit-node's geo-location, DNS server-B 112 may return the IP address of the selected proxy-node to the exit-node. In the following steps, the exit-node may approach and establish a network connection with the selected proxy-node.

Thus, in this way, the current embodiments provide methods and systems to direct an exit-node to connect to a geographically closer proxy-node. Also, it is important to note that the current embodiments eliminate the need for a proxy-gateway or other middleware entity to delegate network connections/traffic between an exit-node and a proxy-node. Hence, the current embodiments may reduce the number of hops it takes for an exit-node to connect to a proxy-node thereby increasing the overall network throughput and latency.

Alternatively, in some embodiments shown in FIG. 1, DNS server-B 112 may be configured to answer the DNS query based on proxy-node metrics, such as but not limited to proxy-nodes' system load levels. For instance, DNS server-B 112 may be configured to answer the DNS query by providing the IP address of a proxy-node with the least amount of system load.

In the embodiments disclosed herein, DNS server-B 112 may fetch, at regular intervals, messages comprising proxy-node metrics belonging to a plurality of proxy-nodes from message streaming platform 108. The fetched messages are then saved within the memory space or storage facility available with DNS server-B 112. Therefore, DNS server-B 112 may possess the necessary proxy-node metrics such as but not limited to system load levels prior to answering the above-described DNS query.

Thus, after receiving the DNS query, DNS server-B 112 may perform a DNS name resolution process by searching through its internal resources and/or domain name servers and a plurality of proxy-node metrics to select one of several proxy-nodes with the least amount of system load. After selecting a proxy-node as described above, DNS server-B 112 may return the IP address of the selected proxy-node to the exit-node. In the following steps, the exit-node may approach and establish a network connection with the selected proxy-node.

Thus, in this way, the current embodiments provide methods and systems to direct an exit-node to approach a proxy-node based on proxy-node metrics, such as but not limited to system load levels. However, it must be understood that, in some embodiments, DNS server-B 112 may answer the DNS query based on other proxy-node metrics, such as but not limited to operating system, battery life and latency. Also, it is important to note that the current embodiments eliminate the need for a proxy-gateway or other middleware entity to delegate network connections/traffic between an exit-node and a proxy-node. Hence, the current embodiments can alleviate the event of system overload occurring in proxy-nodes thereby improving the overall performance of service provider infrastructure 106.

Furthermore, in some embodiments shown in FIG. 1, DNS server-B 112 may be configured to answer the DNS query based on frequent preferences of clients from a certain geo-location. For instance, if the exit node is located in a geo-location frequently preferred by clients from a specific geo-location, then, in that case, DNS server-B 112 may be configured to answer the DNS query by providing the IP address of a proxy-node that is located in the specific geo-location of the clients. For further example, if clients from the UK frequently prefer exit-nodes from Switzerland, then an exit-node located in Switzerland will be provided with the IP address of a proxy-node that is located in the UK instead of Switzerland or Germany.

In the current embodiments, DNS server-B 112 may fetch, at regular intervals, messages comprising clients' frequent preferences from message streaming platform 108. The fetched messages are then saved within the memory space or storage facility available with DNS server-B 112. Therefore, DNS server-B 112 may possess the necessary clients' frequent preferences prior to answering the above-described DNS query.

Therefore, after receiving the DNS query, DNS server-B 112 may perform a DNS name resolution process by searching through its internal resources and/or domain name servers and evaluating the clients' preferences to select a proxy-node that satisfies the clients' frequent preferences. After selecting a proxy-node as described above, DNS server-B 112 may return the IP address of the selected proxy-node to the exit-node. In the following steps, the exit-node may approach and establish a network connection with the selected proxy-node.

Thus, in this way the current embodiments provide methods and systems to direct exit-nodes to connect to proxy-nodes based on clients' frequent preferences. Also, notice that the current embodiments allow exit-nodes to connect directly to proxy-nodes instead of routing the connection through a middleware entity or a gateway. Hence, the current embodiments can optimize network traffic based on clients' preferences and demands, thereby satisfying clients' proxy preferences efficiently and dynamically.

Referring once again to FIG. 1, in some embodiments, a proxy-node when experiencing system overload or resource exhaustion may issue a redirect message to at least one of several exit-nodes that are already connected to it (i.e., to the proxy-node). As soon as the proxy-node detects the system overload or resource exhaustion, the proxy-node may analyze a plurality of proxy-node metrics to find an alternate proxy-node. Specifically, the alternate proxy-node may not experience an immediate event of system overload or resource exhaustion. Moreover, the alternate proxy-node's geo-location may be identical to the geo-location of the proxy-node experiencing system overload or resource exhaustion.

Upon finding the alternate proxy-node as described above, the proxy-node experiencing system overload or resource exhaustion may issue a redirect message to at least one of several exit-nodes that are already connected to it (i.e., to the particular proxy-node). The redirect message may instruct the exit-node(s) to connect to the alternate proxy-node that may not experience an immediate event of system overload or resource exhaustion. The redirect message may comprise, among other things, the IP address of the alternate proxy-node. In response, the exit-node(s) may approach and connect to the alternate proxy-node. Consequently, the exit-node(s) may inform the proxy-node experiencing system overload or resource exhaustion about successful connection with the alternate proxy-node. In response, the proxy-node experiencing system overload or resource exhaustion may terminate the network connection with the exit-node(s) that has successfully connected to the alternate proxy-node.

In the embodiments disclosed herein, a proxy-node present within SPI 106 may, at regular intervals, fetch messages comprising proxy-node metrics from message streaming platform 108. The fetched messages are saved or stored in the proxy-node's memory spaces or storage facilities. Therefore, the proxy-node may have access to the necessary information, such as proxy-node metrics, prior to finding an alternate proxy-node that may not experience an immediate event of system overload or resource exhaustion.

Thus in this way, the current embodiments provide systems and methods wherein a proxy-node experiencing system overload or resource exhaustion may redirect exit-nodes to an alternate proxy-node that may not experience an immediate system overload or resource exhaustion. Hence, the current embodiments ensure the seamless functioning of proxy services even during system overloads and exhaustion of resources.

In FIG. 1, in some embodiments, a proxy-node preparing for a graceful shutdown may issue a redirect message to at least one of several exit-nodes that are already connected to it (i.e., to the proxy-node). As soon as the proxy-node prepares for a graceful shutdown, the proxy-node may analyze a plurality of proxy-node metrics to find an alternate proxy-node that may be currently active (hereinafter referred to as active proxy-node). The active proxy-node's geo-location may be identical to the geo-location of the proxy-node, preparing for a graceful shutdown.

Upon finding the active proxy-node, the proxy-node preparing for a graceful shutdown may issue a redirect message to at least one of several exit-nodes that are already connected to it (i.e., to the particular proxy-node). The redirect message may instruct the exit-node(s) to connect to the active proxy-node. The redirect message may comprise, among other things, the IP address of the active proxy-node. In response, the exit-node(s) may approach and connect to the active proxy-node. Consequently, the exit-node(s) may inform the proxy-node preparing for a graceful shutdown about the successful network connection with the active proxy-node. In response the proxy-node preparing for a graceful shutdown may terminate the network connection with the exit-node(s) that has successfully connected to the active proxy-node. Ultimately, the proxy-node preparing for a graceful shutdown may finally shut down its operations.

As described in the earlier sections, in the embodiments disclosed herein, a proxy-node present within SPI 106 may, at regular intervals, fetch messages comprising proxy-node metrics from message streaming platform 108. The fetched messages are saved or stored in the proxy-node's memory spaces or storage facilities. Therefore, the proxy-node may possess the necessary information, such as proxy-node metrics, prior to finding an active proxy-node.

Thus, the current embodiments provide systems and methods wherein a proxy-node preparing for a graceful shutdown may redirect exit-nodes to an active proxy-node, thereby ensuring the continued functioning of proxy services even when a proxy-node has to shut down its operations.

Referring once again to FIG. 1, in some embodiments, a proxy-node may issue a redirect message to at least one of several exit-nodes from an incorrect geo-location that are erroneously connected to it (i.e., to the proxy-node). As soon as the proxy-node notices that at least one of several exit-nodes is connected from a distant or an incorrect geo-location, the proxy-node may analyze a plurality of proxy-node metadata to find an alternate proxy-node geographically closer to the at least one of several exit-nodes connected from an incorrect geo-location (hereinafter referred to as suitable proxy-node).

Upon finding the suitable proxy-node as described above, the proxy-node that notices the erroneous network connection may issue a redirect message to at least one of several exit-nodes that are erroneously connected to the proxy-node from an incorrect geo-location. The redirect message may instruct the exit-node(s) to connect to the suitable proxy-node. The redirect message may comprise, among other things, the IP address of the suitable proxy-node. In response, the exit-node(s) may approach and connect to the suitable proxy-node. Consequently, the exit-node(s) may inform the proxy-node that notices the erroneous network connection about the successful connection with the suitable proxy-node. In response, the proxy-node that notices the erroneous network connection may terminate the network connection with the exit-node(s) that successfully connected to the suitable proxy-node.

As described in the earlier sections, in the embodiments disclosed herein, a proxy-node present within SPI 106 may, at regular intervals, fetch messages comprising proxy-node metadata from message streaming platform 108. The fetched messages are saved or stored in the proxy-node's memory space or storage facilities. Therefore, the proxy-node may possess the necessary information, such as proxy-node metadata, prior to finding a suitable proxy-node.

Thus, the current embodiments provide systems and methods wherein a proxy-node holding connection with an exit-node from incorrect geo-locations may redirect the exit-node to a suitable proxy-node, thereby providing a solution to regulate faulty network connections. Also, the current embodiments may ensure error-proof network connections among the proxy servers servicing multiple proxy clients.

Referring to FIG. 1, a client module 102 may approach SPI 106 and seek a network connection directly with at least one of the proxy servers. Before connecting with at least one of the proxy servers, client module 102 may first submit a DNS query to DNS server-A 104 via network 118. The DNS query, typically, may comprise but not limited to a query domain name (usually domain name of a proxy-node), query type and query class. In some embodiments shown in FIG. 1, DNS server-A 104 may be configured to answer the DNS query based on geo-locational routing. Specifically, DNS server-A 104 may answer the DNS query by providing the IP address of a proxy-node that is geographically closer to client module 102, or the IP address of a proxy-node present in the client module's 102 geo-location.

Right after receiving the DNS query, DNS server-A 104 may look up the geo-location of client module 102 based on the IP address of client module 102. After which, DNS server-A 104 may find the IP address of a proxy-node that is geographically closer to client module 102 by performing a DNS name resolution process. Subsequently, the DNS server-A 104 may return the IP address of the found proxy-node to client module 102. Following this, client module 102 may approach the geographically closer proxy-node for a network connection, which in return, may establish the network connection with client module 102.

Thus, the current embodiments provide methods and systems that enable a client module 102 to directly approach a geographically closer proxy-node for a network connection. Also, it is important to note that the current embodiments eliminate the need for a proxy-gateway or other middleware entity to delegate network traffic between a client module 102 and a proxy-node. Furthermore, the current embodiments may reduce the number of hops it takes for a client module 102 to connect to a proxy-node thereby increasing the overall network throughput and latency.

However, in some embodiments shown in FIG. 1, the DNS query submitted by client module 102 to DNS server-A 104 may, among other things, comprise the client's prerequisites. In such cases, the DNS server-A 104 may be configured to answer the DNS query based on the client's prerequisites. Specifically, DNS server-A 104 may answer the DNS query by providing the IP address of a proxy-node that conforms to the client's prerequisites. Here, client's prerequisites are preconditions for a proxy-node such as but not limited to geo-location specifications, operating system configuration details and information on browser type.

Therefore, right after receiving the DNS query, DNS server-A 104 may inspect the prerequisites of the client present in or along with the DNS query. Following this, DNS server-A 104 may find the IP address of a proxy-node that conforms to client's prerequisites and return the IP address of the found proxy-node to client module 102. A plurality of proxy-node metadata may also aid DNS server-A 104 in finding the IP address of the proxy-node that conforms to client's prerequisites. It must be recalled here, that DNS server-A 104 may continually, at regular intervals, fetch messages containing proxy-node metadata from message streaming platform 108.

Subsequently, client module 102 may approach the proxy-node that conforms to the prerequisites of the client for a network connection, which in return, may establish the network connection with client module 102. Thus, the current embodiments provide methods and systems that enable a client module 102 to directly approach a proxy-node that conforms to the client's prerequisites for a network connection. Also, it is important to note that the current embodiments eliminate the need for a proxy-gateway or other middleware entity to delegate network traffic between a client module 102 and a proxy-node. Furthermore, the current embodiments may reduce the number of hops it takes for a client module 102 to connect to a proxy-node thereby increasing the overall network throughput and latency. In addition, the current embodiments improve the client experience by satisfying the client's needs or requirements.

Furthermore, in some embodiments shown in FIG. 1, DNS server-A 014 may be configured to answer the DNS query based on the client's regular activities. It should be recalled that the term 'client' refers to a variety of entities responsible for owning and/or operating and/or administering client module 102. Specifically, DNS server-A 104, may be configured to answer the DNS query by providing the IP address of a proxy-node deemed to be appropriate for the client's regular activities. Client's regular activities may be a collection of data that informs about, but not limited to, the regularly used or preferred proxy-nodes/exit-nodes by the client, regular security policies of the client and regularly requested service types of the client.

It must be understood that, in the current embodiments, prior to DNS server-A 104 receiving the DNS query, SPI 106, at regular intervals, may feed DNS server-A 104 via message streaming platform 108, a plurality of messages/data comprising the regular activities of multiple clients. The aforementioned messages/data may be stored within the storage facilities of DNS server-A 104. Hence, DNS server-A 104 may have necessary data to select the IP address of a proxy-node deemed to be appropriate for the client's regular activities.

Right after receiving the DNS query from client module 102, DNS server-A 104 may retrieve and analyze the data comprising the client's regular activities. Subsequently, DNS server-A 104 may find the IP address of a proxy-node that is deemed to be appropriate for the client's regular activities and return the found IP address to client module 102. A plurality of proxy-node metadata may also aid DNS server-A 104 in finding the IP address of the proxy-node that is deemed to be appropriate for the client's regular activities. It must be recalled here, that DNS server-A 104 may continually, at regular intervals, fetch messages containing proxy-node metadata from message streaming platform 108.

Subsequently, client module 102 may approach the proxy-node that is deemed to be appropriate for the client's regular activities for a network connection, which in return, may establish the network connection with client module 102. Thus, the current embodiments provide methods and systems that enable a client module 102 to directly approach a proxy-node that is deemed to be appropriate for the client's regular activities for a network connection. Also, it is important to note that the current embodiments eliminate the need for a proxy-gateway or other middleware entity to delegate network traffic between a client module 102 and a proxy-node. Furthermore, the current embodiments may reduce the number of hops it takes for a client module 102 to connect to a proxy-node thereby increasing the overall network throughput and latency. In addition, the current embodiments improve the client experience by satisfying the client's needs or requirements.

In FIG. 1, right after client module 102 connects to one of several proxy-nodes, as described in the earlier sections of the current disclosure, client module 102 may send client request and request parameters to the connected proxy-node via network 118. The client request may be, but not limited to, a web request, and/or search query and/or data/service request intended for target 116. Typically, the client request may include but not limited to a target URL (e.g., URL of target 116). The request parameters sent along with the client request indicate the type of exit-node required by the client to service the client request. For example, request parameters may comprise but are not limited to exit-node geo-location specifications, browser specifications, exit-node operating system configuration details.

After receiving the client request and request parameters, the proxy-node may evaluate the request parameters. In some embodiments depicted in FIG. 1, the proxy-node may find an exit-node that satisfies the request parameters from among the several exit-nodes already connected to the proxy-node. Specifically, the proxy-node may find the suitable exit-node by searching through metadata of exit-nodes that are connected to it (i.e., to the proxy-node). In the current disclosure, the exit-nodes that satisfy the request parameters are referred to as 'suitable exit-nodes'. Eventually, the proxy-node may forward the client request to the suitable exit-node, which in turn, may forward the client request to a target (represented by target 116) via network 118. Consequently, the target may return a response to the suitable exit-node via network 118. Following this, the suitable exit-node may receive and forward the response to the proxy-node, which in turn, may forward the response to client module 102 via network 118. By this way, client requests are serviced by proxy-nodes through suitable exit-nodes.

However, in some embodiments depicted in FIG. 1, after evaluating the request parameters, the proxy-node may not be able to find a suitable exit-node. That is, the proxy-node may not be connected to an exit-node that satisfies the request parameters. In such cases, the proxy-node may determine the lack of a suitable exit-node and, eventually, finds a subsequent proxy-node connected to a suitable exit-node. Specifically, the subsequent proxy-node is found by searching through a plurality of proxy-node metadata.

After which, the proxy-node may forward the client request and request parameters to the subsequent proxy-node, which upon receiving the aforesaid data, may evaluate the request parameters. The subsequent proxy-node may find a suitable exit-node by searching through the metadata of exit-nodes already connected to it (i.e., to the subsequent proxy-node). After which, the subsequent proxy-node may forward the client request to the suitable exit-node, which in turn, may forward the client request to a target (represented by target 116) via network 118. The target returns a response to the suitable exit-node via network 118, which forwards the response back to the subsequent proxy-node. The subsequent proxy-node may receive and forward the response back to the proxy-node that initially forwarded the client request to it. Finally, the proxy-node receives the response from the subsequent proxy-node and forwards the response to client module 102. This way, client requests are serviced by proxy-nodes that may lack connections to suitable exit-nodes.

Alternatively, in some embodiments shown in FIG. 1, after evaluating the request parameters, the proxy-node may notice that the particular request parameters are repeatedly accompanied with client requests originating from client module 102. In addition, the proxy-node may notice that the client requests accompanied with the particular request parameters are frequently serviced through a specific exit-node connected to a subsequent proxy-node.

In such cases, the proxy-node may send a transfer message to the subsequent proxy-node. The transfer message may inform the subsequent proxy-node to redirect the specific exit-node to the proxy-node that initially sent the transfer message. In response, the subsequent proxy-node may issue a redirect message to the specific exit-node. The redirect message instructs the specific exit-node to approach the proxy-node that initially sent the transfer message for a network connection. The redirect message may comprise but not limited to the IP address of the proxy-node. Eventually, the specific exit-node may approach the proxy-node for a network connection which in response, may establish the network connection with the specific exit-node.

Now, the proxy-node may forward the client request to the specific exit-node that frequently services the client requests originating from client module 102. The specific exit-node may forward the client request to a target (represented by target 116) via network 118. The target may return a response to the specific exit-node via network 118, which forwards the response back to the proxy-node. Finally, the proxy-node forwards the response back to client module 110 via network 118. In this way, the current embodiments provide systems and methods that enable a proxy-node to redirect and obtain a connection with a specific exit-node that is already connected to a different proxy-node to service the client request.

Figure 2:
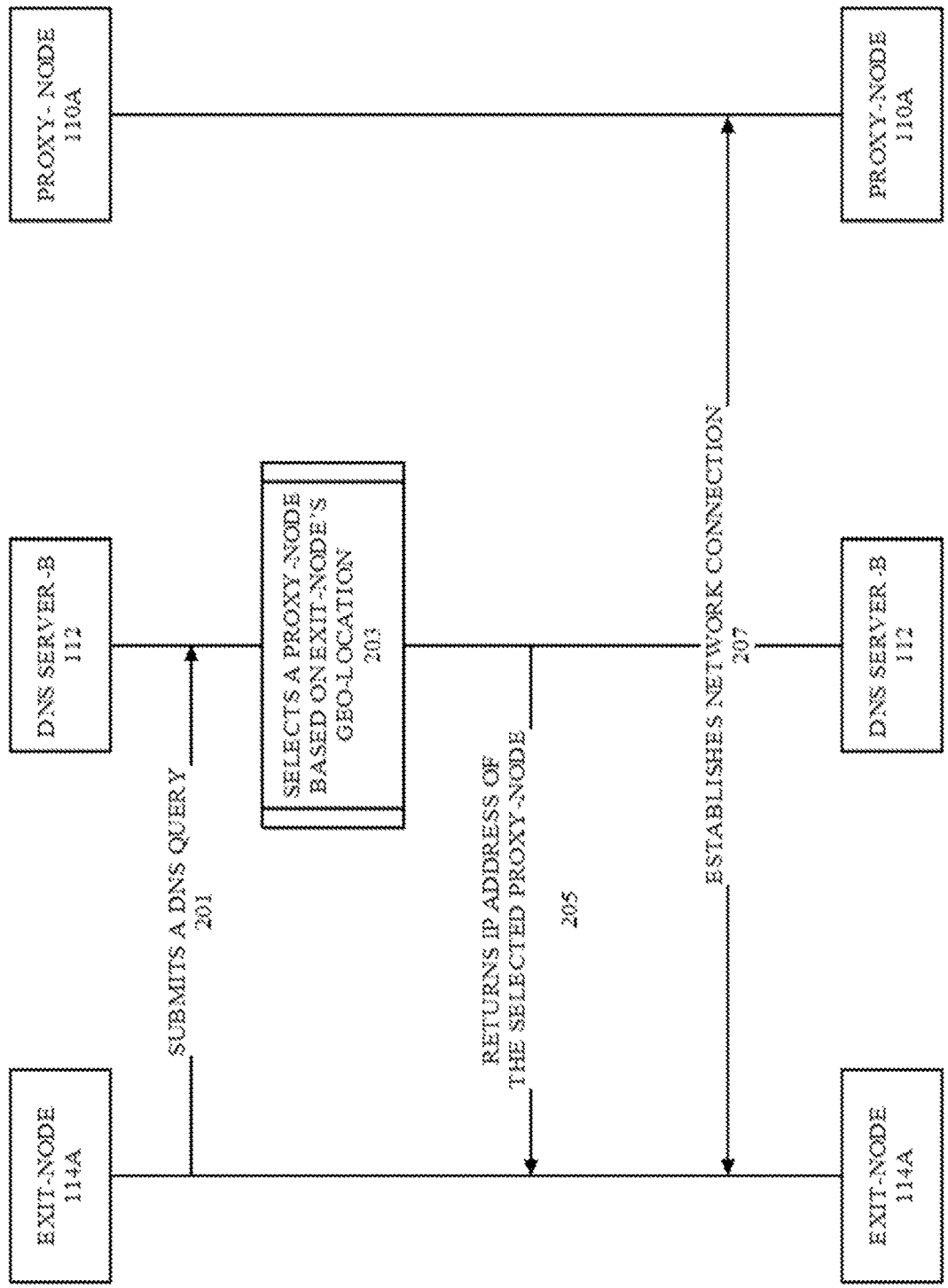
FIG. 2 is an exemplary flow sequence diagram showing how an exit-node is directed to a geographically closer proxy-node.

FIG. 2 is an exemplary flow sequence diagram showing how an exit-node is directed to a geographically closer proxy-node. The current exemplary flow sequence diagram begins at step 201 where exit-node 114A seeking a network connection with at least one of several proxy-nodes present within SPI 106, submits a DNS query to DNS server-B 112. Typically, the DNS query may comprise but not limited to a query domain name (usually domain name of a proxy-node), query type and query class. In the current exemplary flow sequence diagram, the DNS server-B 112 is configured to answer the DNS query according to the geo-location of exit-node 114A.

Therefore, after receiving the the DNS query from exit-node 114A, DNS server-B 112 may perform a DNS name resolution process by searching through its internal resources and/or domain name servers to select one of several proxy-nodes whose geo-location is closer or identical to the exit-node's 114A geo-location. In addition, the DNS server-B 112 may ascertain the exit-node's 114A geo-location by its IP address. Consequently, in step 203, DNS server-B 112 selects a proxy-node whose geo-location is closer or identical to the geo-location of exit-node 114A. In the current exemplary flow sequence diagram, proxy-node 110A represents a proxy-node whose geo-location is closer or identical to the geo-location of exit-node 114A. Therefore, DNS server-B 112 selects proxy-node 110A.

In the following step, i.e., in step 205, DNS server-B 112 returns the IP address of the selected proxy-node, i.e., the IP address of proxy-node 110A to exit-node 114A. Accordingly, exit-node 114A receives the IP address of proxy-node 110A, and in step 207, exit-node 114A approaches proxy-node 110A and establishes network connection with proxy-node 110A. It should be understood that step 207 represents all necessary steps carried out by exit-node 114A and proxy-node 110A to establish the network connection.

In this way, the current exemplary flow sequence diagram shows how an exit-node is directed to connect to a geographically closer proxy-node without the need of any proxy-gateway or other middleware entirely to delegate network connections or traffic between the exit-node and the proxy-node.

Figure 3:
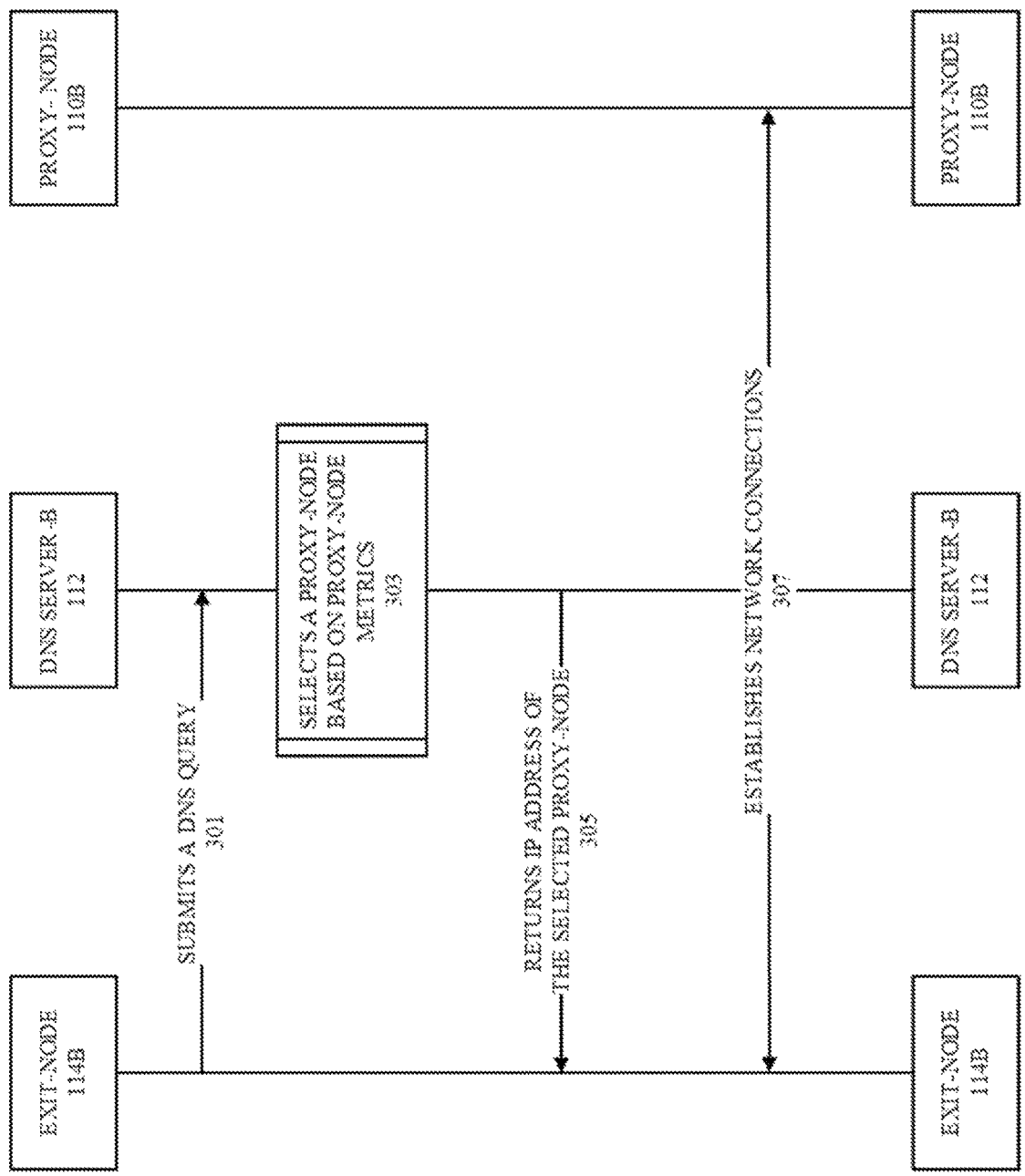
FIG. 3 is an exemplary flow sequence diagram showing how an exit-node is directed to connect to a proxy-node based on proxy-node metrics.

FIG. 3 is an exemplary flow sequence diagram showing how an exit-node is directed to connect to a proxy-node based on proxy-node metrics. The flow starts in step 301, where exit-node 114B, seeking a network connection with at least one of several proxy-nodes present within SPI 106, submits a DNS query to DNS server-B 112. In the current exemplary flow sequence diagram, DNS server-B 112 is configured to answer the DNS query according to proxy-node metrics such as but not limited to proxy-nodes' system load levels. More specifically, DNS server-B 112 answers the DNS query by returning the IP address of a proxy-node with the least amount of system load. Specifically, DNS server-B 112 may perform a DNS name resolution process by searching through its internal resources and/or domain name servers and multiple proxy-node metrics belonging to a plurality of proxy-nodes to select one of several proxy-nodes with the least amount of system load.

In the current exemplary flow sequence diagram, DNS server-B 112 may fetch, at regular intervals, messages comprising proxy-node metrics belonging to a plurality of proxy-nodes from message streaming platform 108 (not shown). The fetched messages are then saved within the memory space or storage facilities available with DNS server-B 112. Therefore, DNS server-B 112 may possess the necessary proxy-node metrics such as but not limited to system load levels prior to answering the above-described DNS query.

Consequently, in step 303, DNS server-B 112 selects a proxy-node with the least amount of system load. In the current exemplary flow sequence diagram, proxy-node 110B represents a proxy-node with the least amount of system loads. Therefore, DNS server-B 112 selects proxy-node 110B. In the following step, i.e., in step 305, DNS server-B 112 returns the IP address of the selected proxy-node, i.e., the IP address of proxy-node 110B to exit-node 114B. Accordingly, exit-node 114B receives the IP address of proxy-node 110B, and in step 307, exit-node 114B approaches proxy-node 110B and establishes a network connection with proxy-node 110B. It should be understood that step 307 represents all necessary steps carried out by exit-node 114B and proxy-node 110B to establish the network connection.

In this way, the current exemplary flow sequence diagram shows how an exit-node is directed to connect to a proxy-node based on proxy-node metrics, especially to a proxy-node with the least amount of system loads without the need of any proxy-gateway or other middleware entirely to delegate network connections or traffic between the exit-node and the proxy-node. However, it must be understood that, FIG. 3 is only an exemplary flow sequence diagram, in actuality, DNS server-B 112 may answer the DNS queries based on other proxy-node metrics, such as but not limited to operating system, battery life and latency.

Figure 4:
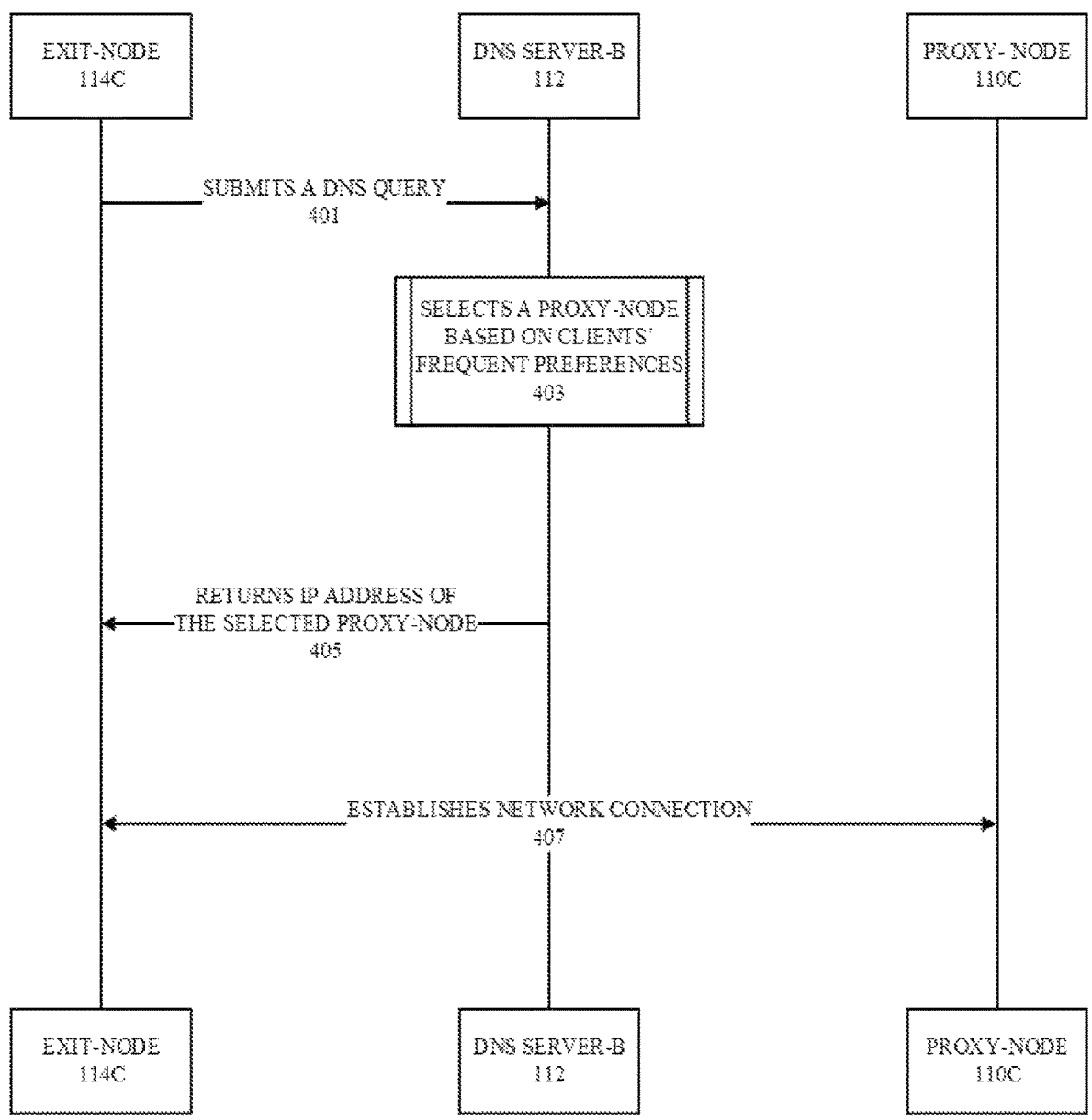
FIG. 4 is an exemplary flow sequence diagram showing how an exit-node is directed to connect to a proxy-node based on clients' frequent preferences from a certain geo-location.

FIG. 4 is an exemplary flow sequence diagram showing how an exit-node is directed to connect to a proxy-node based on clients' frequent preferences from a certain geo-location. The current exemplary flow starts in step 401, where exit-node 114C, seeking a network connection with at least one of several proxy-nodes present within SPI 106, submits a DNS query to DNS server-B 112. In the current exemplary flow sequence diagram, DNS server-B 112 is configured to answer the DNS query according to clients' frequent preferences. For instance, if the exit node is located in a geo-location frequently preferred by clients from a specific geo-location, then, in that case, DNS server-B 112 may be configured to answer the DNS query by providing the IP address of a proxy-node that is located in the specific geo-location of the clients. For further example, if clients from the UK frequently prefer exit-nodes from Switzerland, then an exit-node located in Switzerland will be provided with the IP address of a proxy-node that is located in the UK instead of Switzerland or Germany.

Specifically, DNS server-B 112 may perform a DNS name resolution process by searching through its internal resources and/or domain name servers and evaluating the clients' preferences from a specific geo-location to select one of several proxy-nodes that satisfies the clients' preferences. Consequently, in step 403, DNS server-B 112 selects a proxy-node that satisfies the clients' preferences.

In the current exemplary flow sequence diagram, DNS server-B 112 may fetch, at regular intervals, messages comprising clients' preferences from message streaming platform 108 (not shown). The fetched messages are then saved within the memory space or storage facilities available with DNS server-B 112. Therefore, DNS server-B 112 may possess the necessary information such as the clients' preferences to answer the above-described DNS query.

In the current exemplary flow sequence diagram, proxy-node 110C represents a proxy-node that satisfies the clients' preferences. Therefore, DNS server-B 112 selects proxy-node 110C. In the following step, i.e., in step 405, DNS server-B 112 returns the IP address of the selected proxy-node, i.e., the IP address of proxy-node 110C to exit-node 114C. Accordingly, exit-node 114C receives the IP address of proxy-node 110C, and in step 407, exit-node 114C approaches proxy-node 110C and establishes a network connection with proxy-node 110C. It should be understood that step 407 represents all necessary steps carried out by exit-node 114C and proxy-node 110C to establish the network connection. In this way, the current exemplary flow sequence diagram shows how an exit-node is directed to connect to a proxy-node based on clients' frequent preferences without the need of any proxy-gateway or other middleware entirely to delegate network connections or traffic between the exit-node and the proxy-node.

Figure 5:
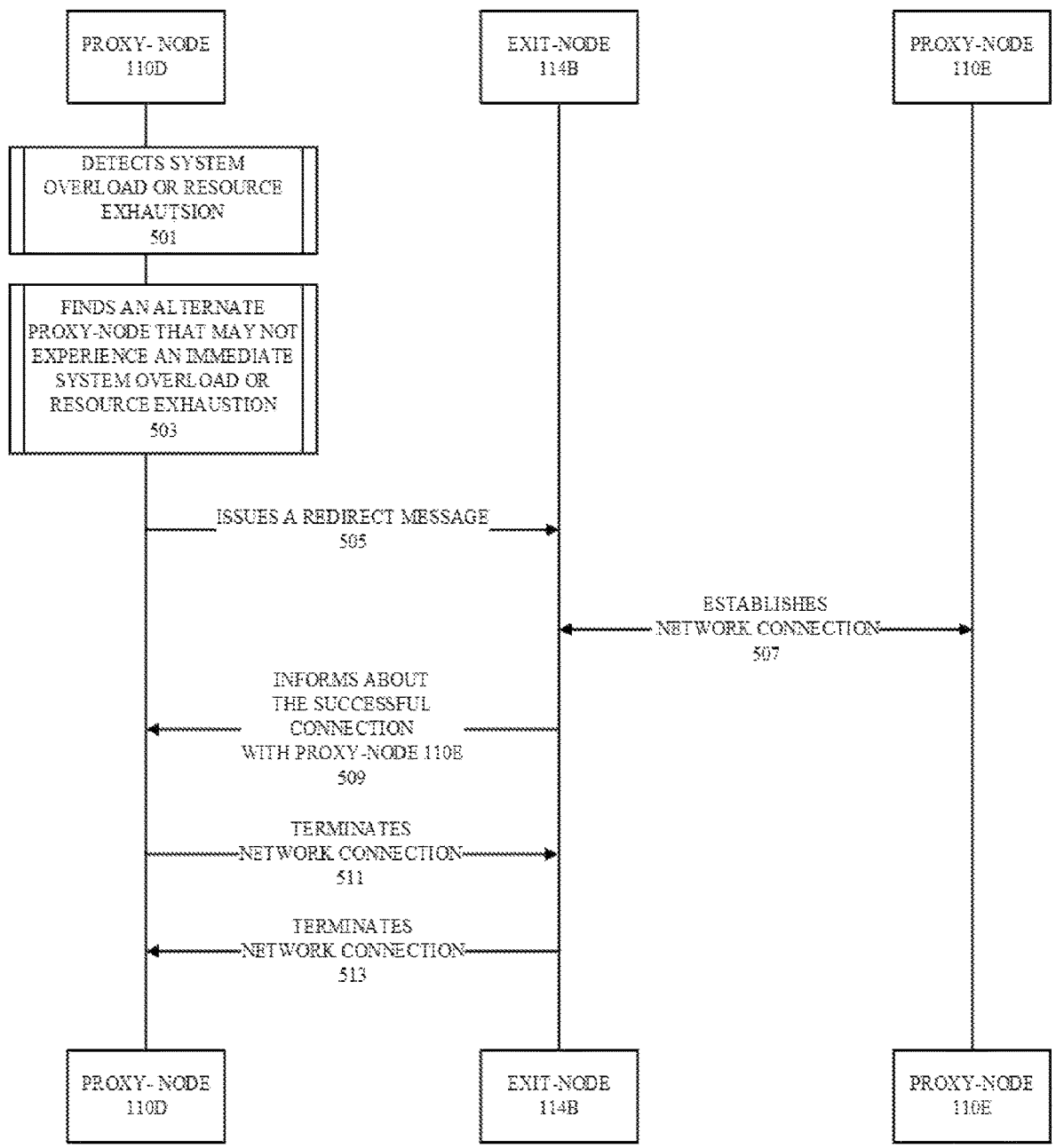
FIG. 5 is an exemplary flow sequence diagram showing a proxy-node sending a redirect message to an exit-node, in the event of system overload or resource exhaustion.

FIG. 5 is an exemplary flow sequence diagram showing a proxy-node sending a redirect message to an exit-node, in the event of system overload or resource exhaustion. Proxy-node 110D may experience, in some instances, system overload or resource exhaustion. Therefore, in step 501, proxy-node 110D detects the system overload or resource exhaustion. Subsequently, proxy-node 110D analyzes proxy-node metrics belonging to a plurality of other proxy-nodes and finds an alternate proxy-node that may not experience an immediate event of system overload or resource exhaustion (in step 503). It must be recalled that proxy-node metrics, among other things, may comprise system load levels and resource exhaustion levels of proxy-nodes.

In the current exemplary flow sequence diagram, proxy-node 110E represents a proxy-node that may not experience an immediate event of system overload or resource exhaustion. Therefore, FIG. 5 shows proxy-node 110D finding proxy-node 110E as the alternate proxy-node. Also, it is important to note that the geo-location of proxy-node 110E may be identical to the geo-location of proxy-node 110D.

In step 505, proxy-node 110D issues a redirect message to exit-node 114B. The redirect message comprises but not limited to the IP address of proxy-node 110E. In step 507, having received the redirect message from proxy-node 110D, exit-node 114B approaches and connects with proxy-node 110E. In step 509, after successfully connecting with proxy-node 110E, exit-node 114B sends a message informing the successful connection with proxy-node 110E to proxy-node 110D. Subsequently, in step 511, proxy-node 110D terminates the network connection with exit-node 114B, which in step 513, responds to the termination of the network connection. This way, an exit-node may be redirected to connect to an alternate proxy-node that may not experience an immediate event of system overload or resource exhaustion.

In the current exemplary flow sequence diagram, proxy-node 110D present within SPI 106 may, at regular intervals, fetches messages comprising proxy-node metrics from message streaming platform 108 (not shown). The fetched messages are saved or stored in the proxy-node's memory space or storage facilities. Therefore, proxy-node 110D may have access to the necessary information, such as proxy-node metrics, prior to finding an alternate proxy-node that may not experience an immediate event of system overload or resource exhaustion.

Figure 6:
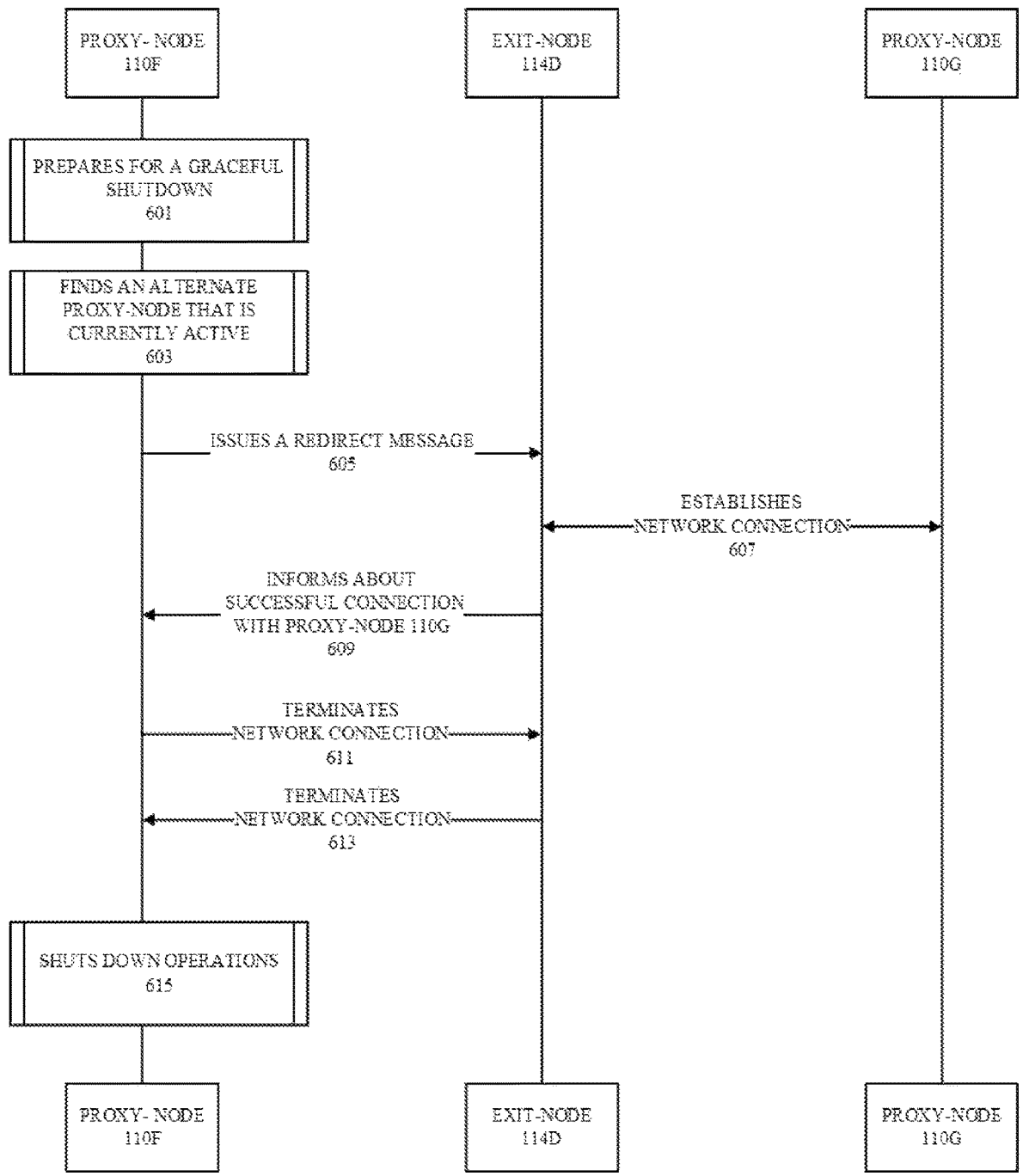
FIG. 6 is an exemplary flow sequence diagram showing a proxy-node sending a redirect message to an exit-node in case of a graceful shutdown.

FIG. 6 is an exemplary flow sequence diagram showing a proxy-node sending a redirect message to an exit-node in case of a graceful shutdown. Proxy-node 110F may, in some instances, prepare for a graceful shutdown (shown in step 601). In step 603, proxy-node 110F analyzes proxy-node metrics belonging to a plurality of other proxy-nodes and finds an active proxy-node. It must be recalled that proxy-node metrics, among other things, may comprise active status indicators of a plurality of proxy-nodes. In the current exemplary flow sequence diagram, proxy-node 110G represents an active proxy-node, therefore, proxy-node 110F may find proxy-node 110G as the active proxy-node. Also it is important to note that the geo-location of proxy-node 110G may be identical to the geo-location of proxy-node 110F.

In step 605, proxy-node 110F issues a redirect message to exit-node 114D. The redirect message comprises but not limited to the IP address of the active proxy-node, i.e., the IP address of proxy-node 110G. Eventually, exit-node 114D receives the redirect message from proxy-node 110F and in step 607, approaches and connects with proxy-node 110G. In step 609, exit-node 114D sends a message informing the successful network connection with proxy-node 110G to proxy-node 110F.

Subsequently, in step 611, proxy-node 110F terminates the network connection with exit-node 114D, which in step 613, may respond to the termination of the network connection. Finally, in step 615, proxy-node 110F shuts down its operations. In this way, an exit-node may be redirected to connect to an active proxy-node.

In the current exemplary flow sequence diagram, proxy-node 110F present within SPI 106 may, at regular intervals, fetches messages comprising proxy-node metrics from message streaming platform 108 (not shown). The fetched messages are saved or stored in the proxy-node's memory space or storage facilities. Therefore, proxy-node 110F may have access to the necessary information, such as proxy-node metrics, prior to finding an active proxy-node.

Figure 7:
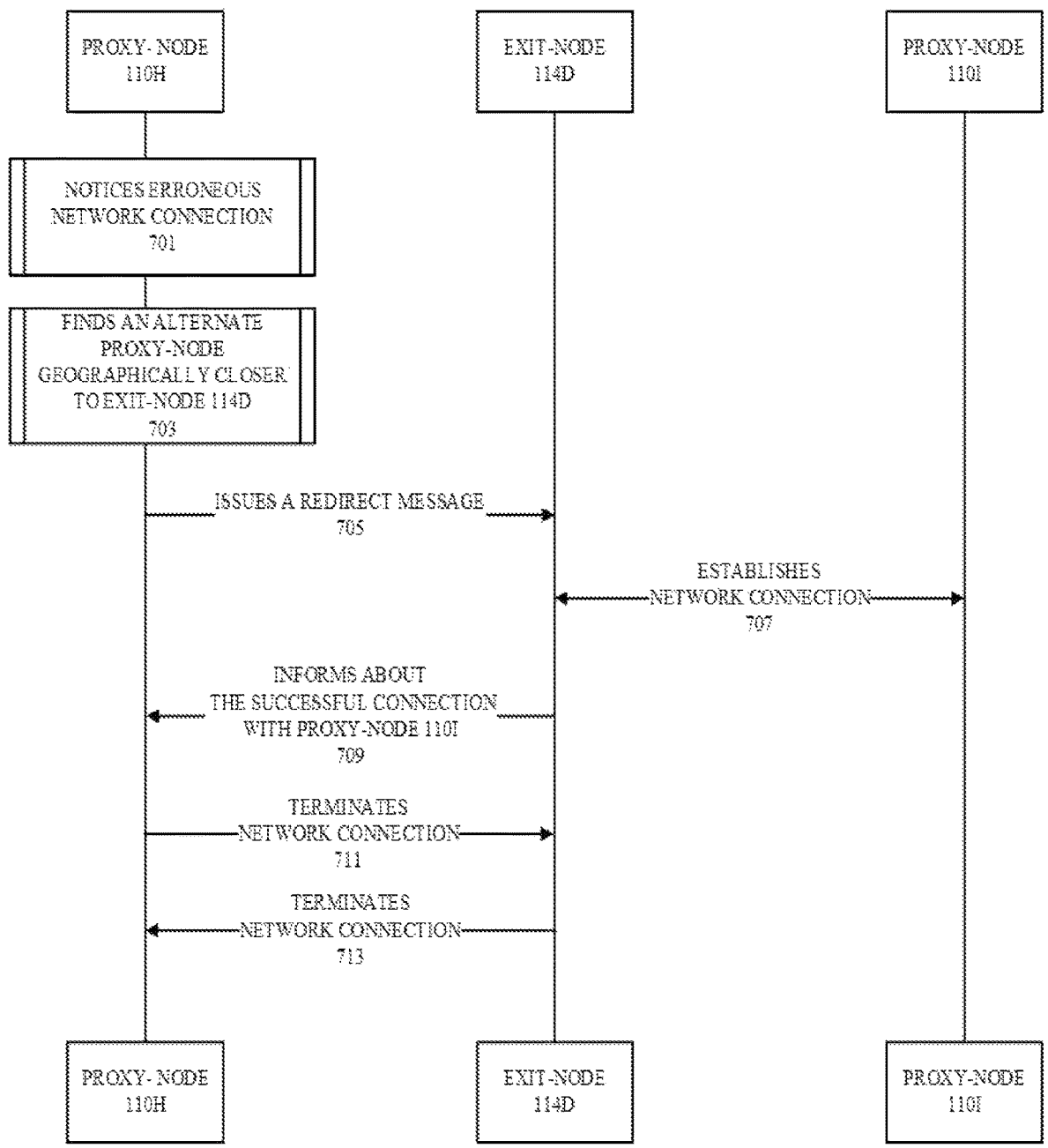
FIG. 7 is an exemplary flow sequence diagram showing a proxy-node sending a redirect message to an exit-node connected from an incorrect geo-location.

FIG. 7 is an exemplary flow sequence diagram showing a proxy-node sending a redirect message to an exit-node connected from a distant or an incorrect geo-location. In the current exemplary flow sequence diagram, exit-node 114D may be connected to proxy-node 110H from an incorrect geo-location. Hence, in step 701, proxy-node 110H notices the erroneous network connection with exit-node 114D. Specifically, exit-node 114D is connected erroneously to proxy-node 110H from a distant or an incorrect geo-location, therefore, in step 701, proxy-ode 110H notices such network connection. In step 703, proxy-node 110H analyzes a plurality of proxy-node metadata and finds an alternate proxy-node that is geographically closer to exit-node 114D (herein referred to as the suitable proxy-node). In the current exemplary flow sequence diagram, proxy-node 110I represents the suitable proxy-node, therefore, proxy-node 110G may find proxy-node 110I as the suitable proxy-node.

In step 705, proxy-node 110H issues a redirect message to exit-node 114D. The redirect message comprises but not limited to the IP address of proxy-node 110I. Subsequently, exit-node 114D receives the redirect message and in step 707, exit-node 114D approaches and connects to proxy-node 110I. In step 709, exit-node 114D sends a message informing the successful network connection with proxy-node 110I to proxy-node 110H. In step 711, proxy-node 110F terminates network connection with exit-node 114D, which in step 713, responds to the termination of network connection, thereby losing the network connection with proxy-node 110H. In this way, an exit-node from a distant geo-location or incorrect geo-location may be redirected to connect to a suitable proxy-node.

In the current exemplary flow sequence diagram, proxy-node 110H present within SPI 106 may, at regular intervals, fetches messages comprising proxy-node metadata from message streaming platform 108 (not shown). The fetched messages are saved or stored in the proxy-node's memory space or storage facilities. Therefore, proxy-node 110H may possess the necessary information, such as proxy-node metadata, prior to finding a suitable proxy-node.

Figure 8:
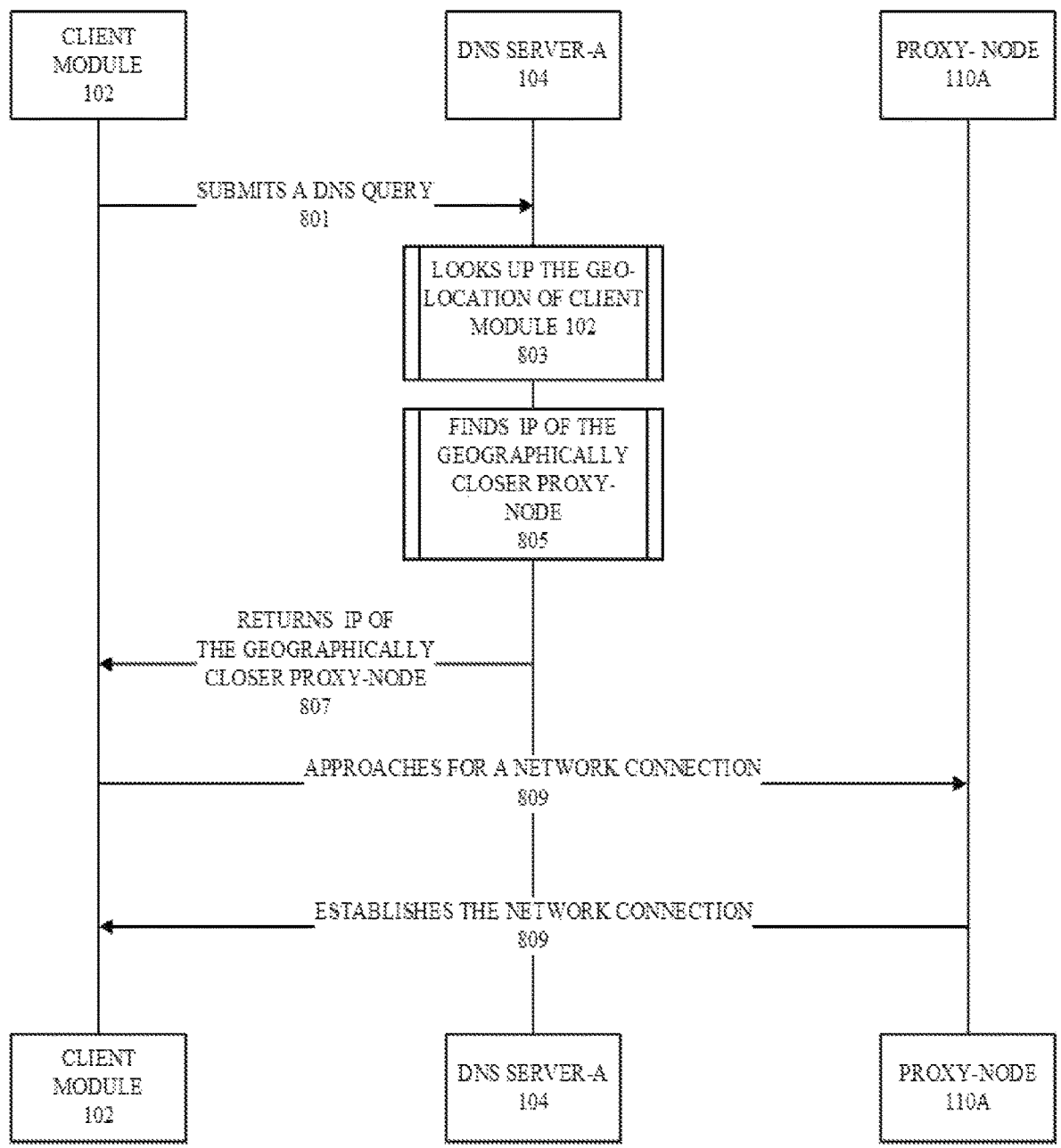
FIG. 8 is an exemplary flow sequence diagram showing a client module 102 connecting to a geographically closer proxy-node.

FIG. 8 is an exemplary flow sequence diagram showing a client module 102 connecting to a geographically closer proxy-node. In the current exemplary flow sequence diagram, client module 102 seeks to connect to a proxy-node present within SPI 106. The current exemplary flow sequence diagram begins at step 801, where client module 102 submits a DNS query to DNS server-A 104 via network 118. The DNS query aims to obtain the IP address of a proxy-node present within SPI 106 so that client module 102 can connect and access the services of a proxy-node. The DNS query, typically, may comprise but not limited to a query domain name (usually domain name of a proxy-node), query type and query class. In the example shown in FIG. 8, DNS server-A 104 is configured to answer the DNS query based on geo-locational routing. Specifically, DNS server-A 104 answers the DNS query by providing the IP address of a proxy-node that is geographically closer to client module 102, for example the IP address of a proxy-node present within the same geo-location of client module 102.

Therefore, DNS server-A 104 receives the DNS query from client module 102 and in step 803, DNS server-A 104 looks up the geo-location of client module 102 based on the IP address of client module 102 present in the DNS query. Subsequently, in step 805, DNS server-A 104 finds the IP address of a proxy-node that is geographically closer to client module 102 by performing a DNS name resolution process. In step 807, DNS server-A 104 returns the IP address of the aforementioned proxy-node to client module 102 via network 118. It must be understood that, in general, the geographically closer proxy-node may, in general, be the geographical region of the requesting client module 102.

In the current example, proxy-node 110A represents a proxy-node that is geographically closer to client module 102. Hence, DNS server-A 104 returns the IP address of proxy-node 110A to client module 102 in step 807. Upon receiving the IP address of proxy-node 110A, client module 102 in step 809, approaches proxy-node 110A and requests a network connection. Subsequently, in step 811, proxy-node 110A responds to the network connection request by establishing the connection with client module 102.

In this way, a client module 102 may directly approach and be connected to a closer proxy-node present within SPI 106 without the need of any proxy-gateway or other middleware entity to delegate network communications between client module 102 and the proxy-node.

Figure 9:
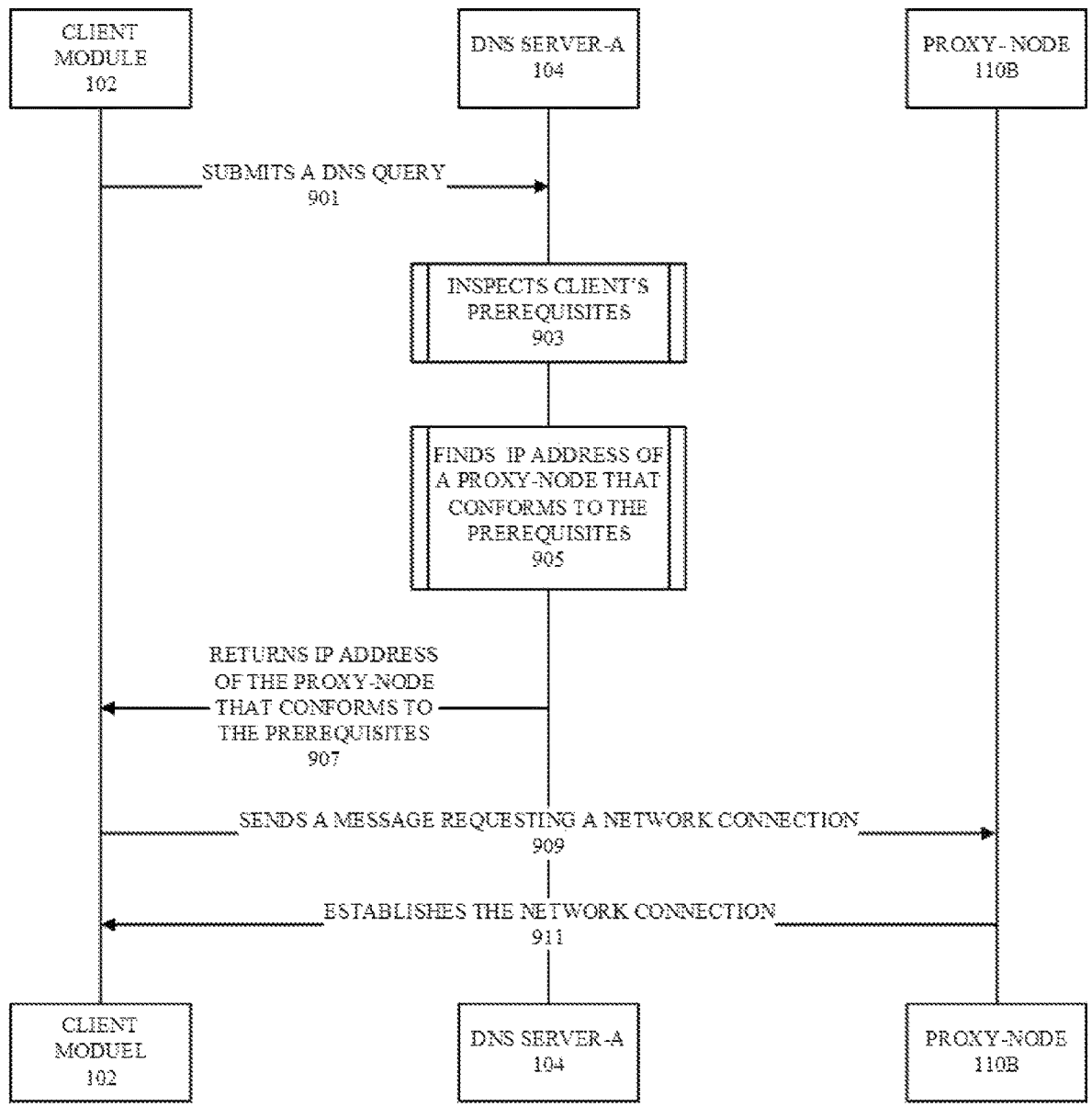
FIG. 9 is an exemplary flow sequence diagram showing a client module 102 connecting to a proxy-node that conforms to the prerequisites of the client.

FIG. 9 is an exemplary flow sequence diagram showing a client module 102 connecting to a proxy-node that conforms to the prerequisites of the client. The current exemplary flow sequence begins at step 901, where client module 102 submits a DNS query to DNS server-A 104 via network 118. The DNS query aims to obtain the IP address of a proxy-node present within SPI 106 so that client module 102 can connect and access the services of a proxy-node. The DNS query, typically, may comprise but not limited to a query domain name (usually domain name of a proxy-node), query type and query class. In addition, the DNS query submitted by client module 102 (in step 901) also comprises client's prerequisites. Here, client's prerequisites are preconditions for a proxy-node such as but not limited to geo-location specifications, operating system configuration details and information on browser type.

In the example shown in FIG. 9, DNS server-A104 is configured to answer the DNS query based on the prerequisites of the client present in or along with the DNS query. Specifically, DNS server-A104 answers the DNS query by providing the IP address of a proxy-node that conforms to the prerequisites of the client. Therefore, DNS server-A 104 receives the DNS query from client module 102 and in step 903, DNS server-A 104 inspects the clients' prerequisites present in the DNS query. Subsequently, in step 905, DNS server-A 104 finds the IP address of a proxy-node that conforms to the prerequisites of the client by performing a DNS name resolution process. Additionally, DNS server-A 104 may also search through a plurality of proxy-node metadata to find the IP address of a proxy-node that conforms to the client's prerequisites.

In step 907, DNS server-A 104 returns the IP address of the aforementioned proxy-node to client module 102 via network 118. In the current example, proxy-node 110B represents a proxy-node that conforms to the client's prerequisites. Hence, DNS server-A 104 returns the IP address of proxy-node 110B to client module 102 in step 907. Upon receiving the IP address of proxy-node 110B, client module 102 in step 909, approaches proxy-node 110A and requests a network connection. Subsequently, in step 911, proxy-node 110B responds to the network connection request by establishing the connection with client module 102.

In this way, a client module 102 may approach and connect directly to a proxy-node that conforms to the prerequisites of the client without the need of any proxy-gateway or other middleware entity to delegate network communications between client module 102 and the proxy-node.

Figure 10:
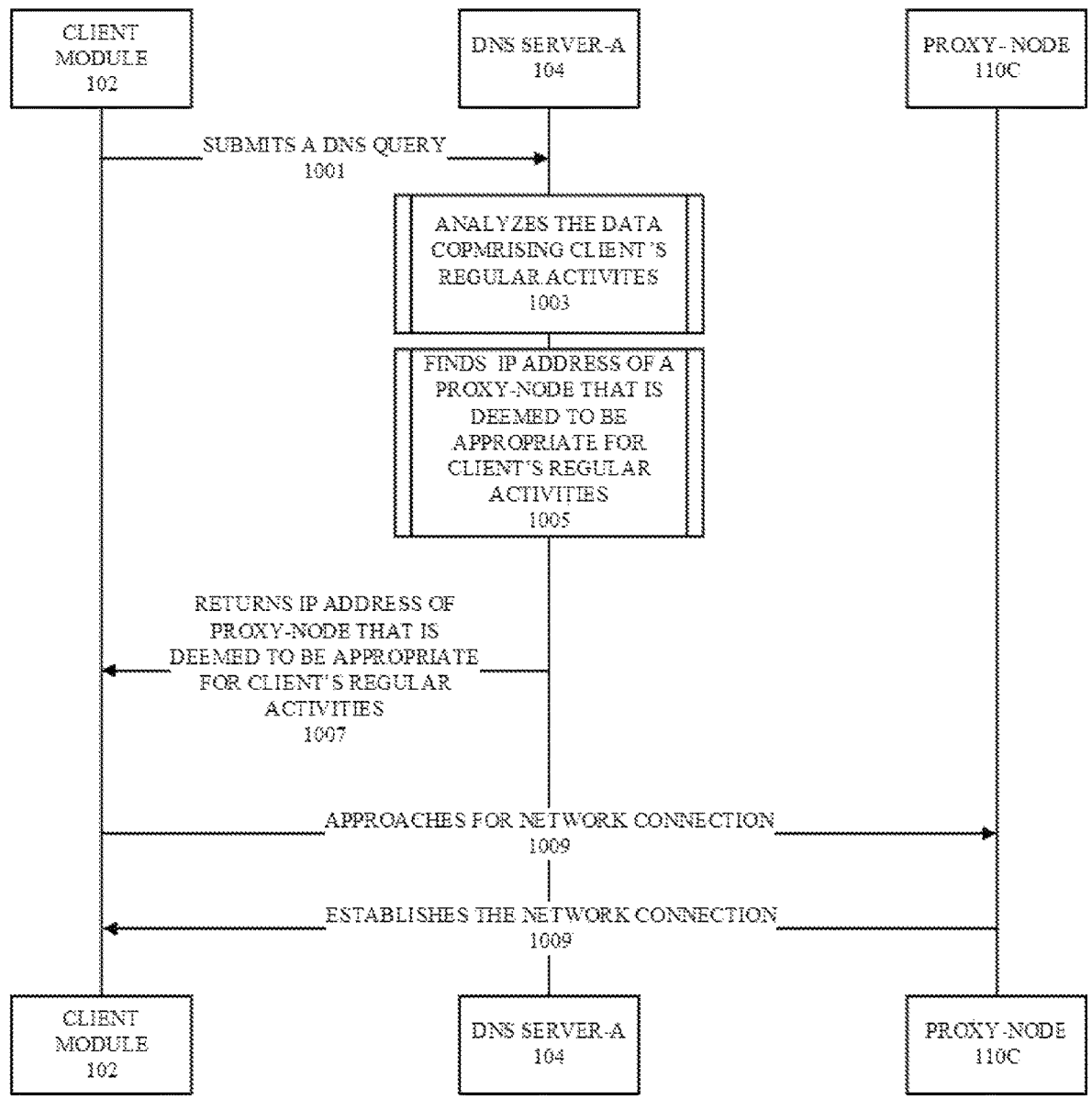
FIG. 10 is an exemplary flow sequence diagram showing a client module 102 connecting to a proxy-node selected based on regular activities of client module 102.

FIG. 10 is an exemplary flow sequence diagram showing a client module 102 connecting to a proxy-node selected based on the client's regular activities. It should be recalled that the term 'client' refers to a variety of entities responsible for owning and/or operating and/or administering client module 102. Moreover, Client's regular activities may be a collection of data that informs about the regularly used or preferred proxy-nodes/exit-nodes by the client, regular security policies of the client and regularly requested service types of the client.

The current exemplary flow sequence begins with step 1001, where client module 102 submits a DNS query to DNS server-A 104 via network 118. Typically, the DNS query may comprise but not limited to a query domain name (usually domain name of a proxy-node), query type and query class. The DNS query aims to obtain the IP address of a proxy-node present within SPI 106 so that client module 102 can connect and access various services of the proxy-node. The DNS query, typically, may comprise but not limited to a query domain name (usually domain name of a proxy-node), query type and query class. In the example shown in FIG. 10, DNS server-A104 is configured to answer the DNS query based on the client's regular activities. Specifically, DNS server-A 104, answers the DNS query by providing the IP address of a proxy-node deemed to be appropriate for client's regular activities.

It must be understood that, in the current example, prior to DNS server-A 104 receiving the DNS query, SPI 106, at regular intervals, feeds DNS server-A 104 via message streaming platform 108, a plurality of messages/data comprising the regular activities of multiple clients. The aforementioned messages/data are stored within the storage facilities of DNS server-A 104. Hence, DNS server-A 104 will have necessary data to select the IP address of a proxy-node deemed to be appropriate for the client's regular activities.

Continuing with the exemplary flow sequence diagram of FIG. 10, in step 1003, DNS server-A 104 receives the DNS query, retrieves the data comprising the client's regular activities from its storage facilities and analyzes the retired data.

Subsequently, in step 1005, DNS server-A 104 finds the IP address of a proxy-node deemed to be appropriate for the client's regular activities. For example, DNS server-A 104 may find the IP address of a proxy-node that is appropriate for the regularly requested service types of client module 102. A plurality of proxy-node metadata may also aid DNS server-A 104 in the above described process. In step 1007, DNS server-A 104 returns the IP address of the aforementioned proxy-node to client module 102 via network 118. In the current example, proxy-node 110C represents a proxy-node deemed to be appropriate for the client's regular activities. Hence, DNS server-A 104 returns the IP address of proxy-node 110C to client module 102 in step 1007. Upon receiving the IP address of proxy-node 110C, client module 102 in step 1009, approaches proxy-node 110C and requests a network connection. Subsequently, in step 1011, proxy-node 110C responds to the network connection request by establishing the connection with client module 102.

In this way, client module 102 may approach and connect directly to a proxy-node deemed to be appropriate for the client's regular activities without the need of any proxy-gateway or other middleware entity to delegate network communications between client module 102 and the proxy-node.

Figure 11:
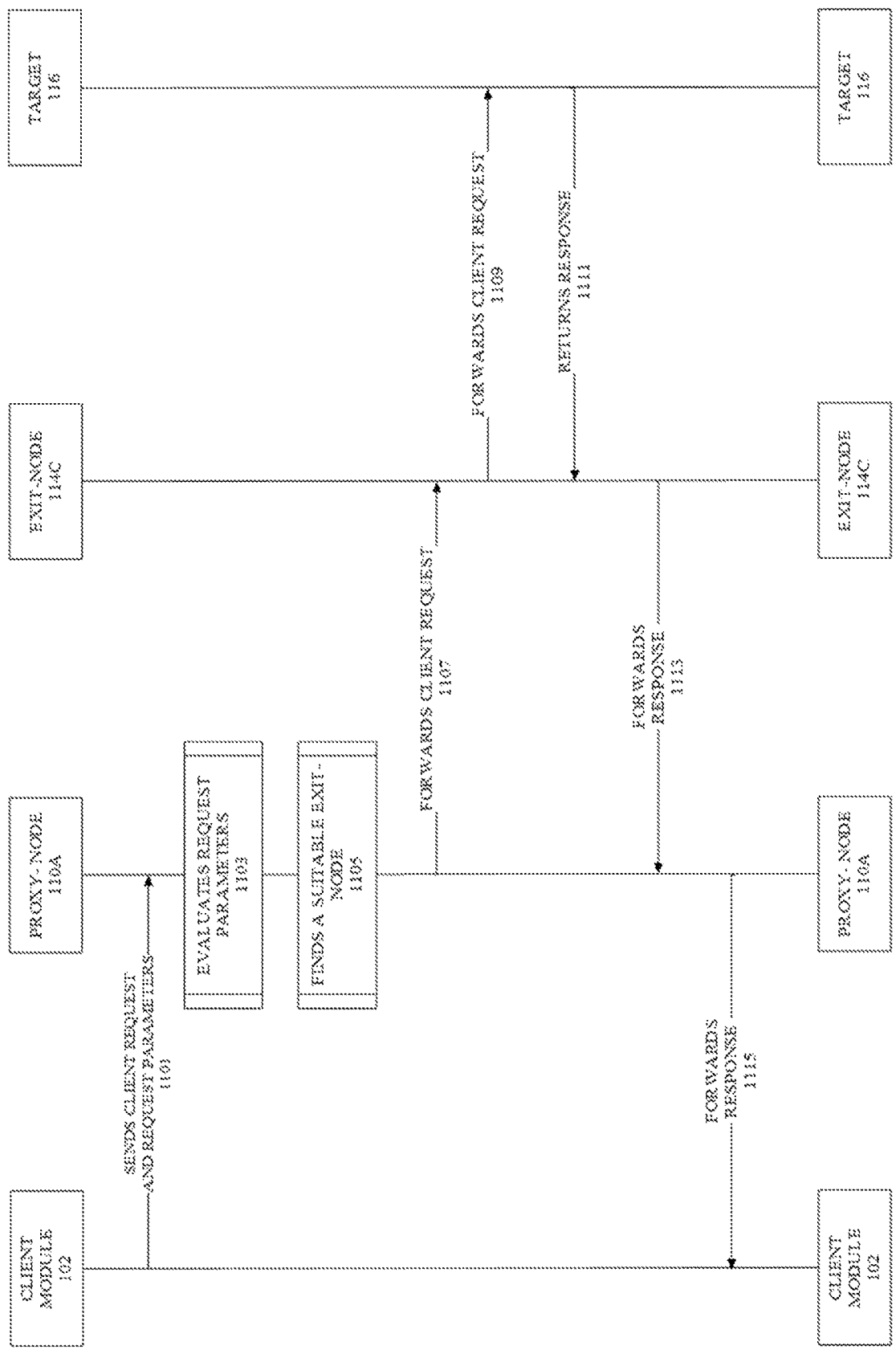
FIG. 11 is an exemplary flow sequence diagram showing the routing of client request from a client module 102 by a proxy-node via an exit-node that satisfies the request parameters.

FIG. 11 is an exemplary flow sequence diagram showing the routing of client request from a client module 102 by a proxy-node via an exit-node that satisfies the request parameters. In the current exemplary flow sequence diagram, client module 102 has been already connected to proxy-node 110A in accordance with at least one of the three methods described in relation to FIG. 8, FIG. 9 and FIG. 10. Therefore, the flow sequence diagram of FIG. 11 begins with step 1101, where client module 102 sends a client request to proxy-node 110A via network 118. In the current example, client module 102 also sends a set of request parameters along with the client request. The request parameters sent along with the client request indicate the type of exit-node required by the client to service the client request. For example, request parameters may comprise but are not limited to exit-node geo-location specifications, browser specifications, exit-node operating system configuration details. Likewise, the client request may be, but not limited to, a web request, and/or search query and/or data/service request intended for target 116. Typically, the client request may include but not limited to a target URL (e.g., URL of target 116).

Proxy-node 110A, in step 1103, evaluates the request parameters after receiving the client request and request parameters from client module 102. Subsequently, proxy-node 110A searches a plurality of exit-node metadata, i.e., metadata of exit-nodes connected to proxy-node 110A. In step 1105, proxy-node 110A finds an exit-node that satisfies the request parameters from among the several exit-nodes connected to it (i.e., to proxy-node 110A). Following this, in step 1107, proxy-node 110A forwards the client request to the suitable exit-node. In the current disclosure, the exit-nodes that satisfy the request parameters are referred to as 'suitable exit-nodes'. Furthermore, exit-node 114C, in the current example, represents the suitable exit-node; therefore, in step 1107, proxy-node 110A forwards the client request to exit-node 114C.

In step 1109, exit-node 114C receives the client request and forwards the client request to target 116 via network 118. In step 1111, target 116 returns a response to the client request to exit-node 114C via network 118. Subsequently, in step 1113, exit-node 114C receives the response from target 116 and forwards the response to proxy-node 110A. Finally, in step 1115, proxy-node 110A receives the response (originated from target 116) from exit-node 114C and forwards it (i.e., the response) to client module 102 via network 118. In this way, a client request is serviced by a proxy-node present within SPI 106 via an exit-node that satisfies the client's request parameters.

Figure 12A:
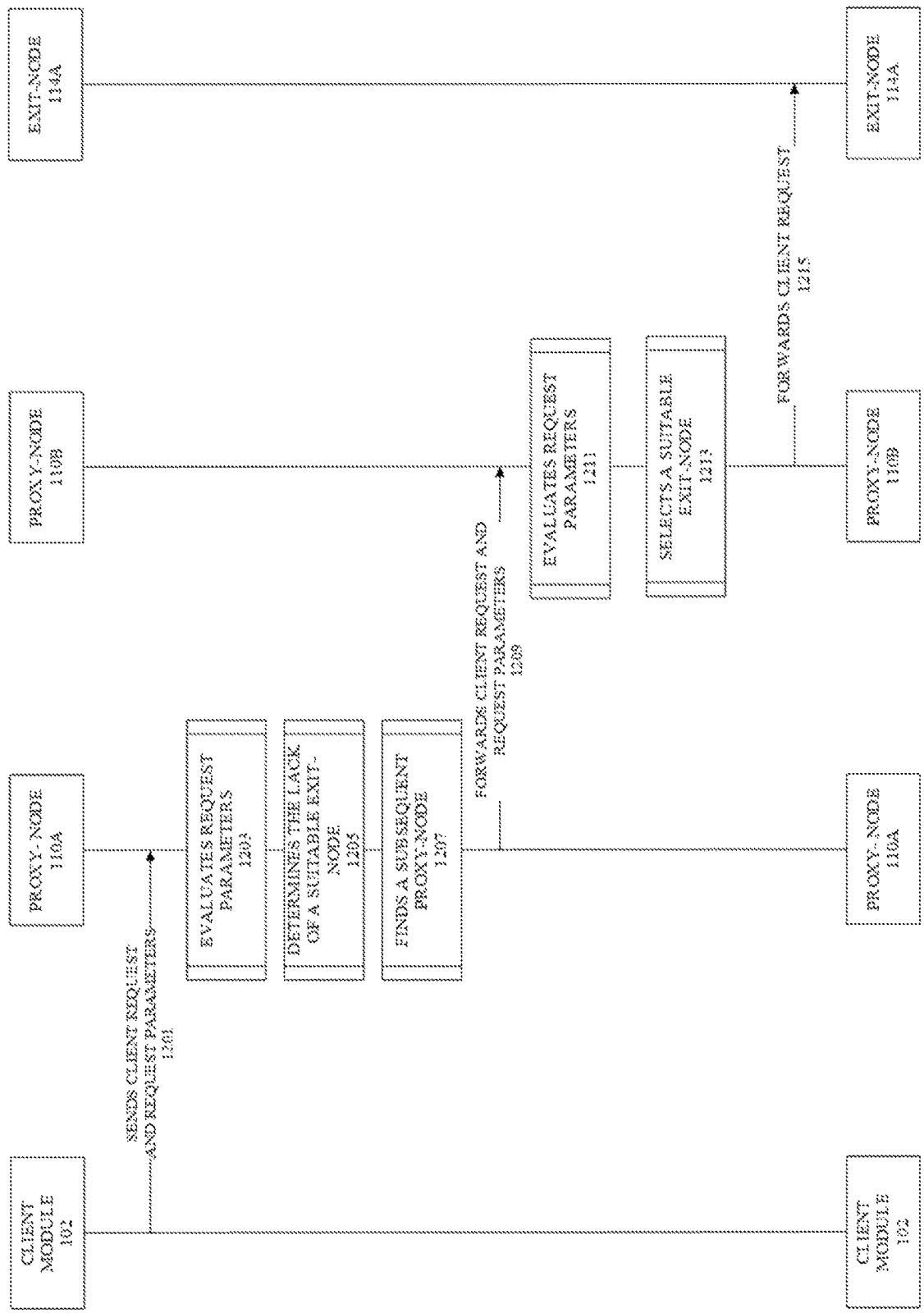
FIGS. 12A-12B are exemplary flow sequence diagrams showing the routing of client requests by a proxy-node in case of lacking a network connection to an exit-node that satisfies the request parameters.
Figure 12B:
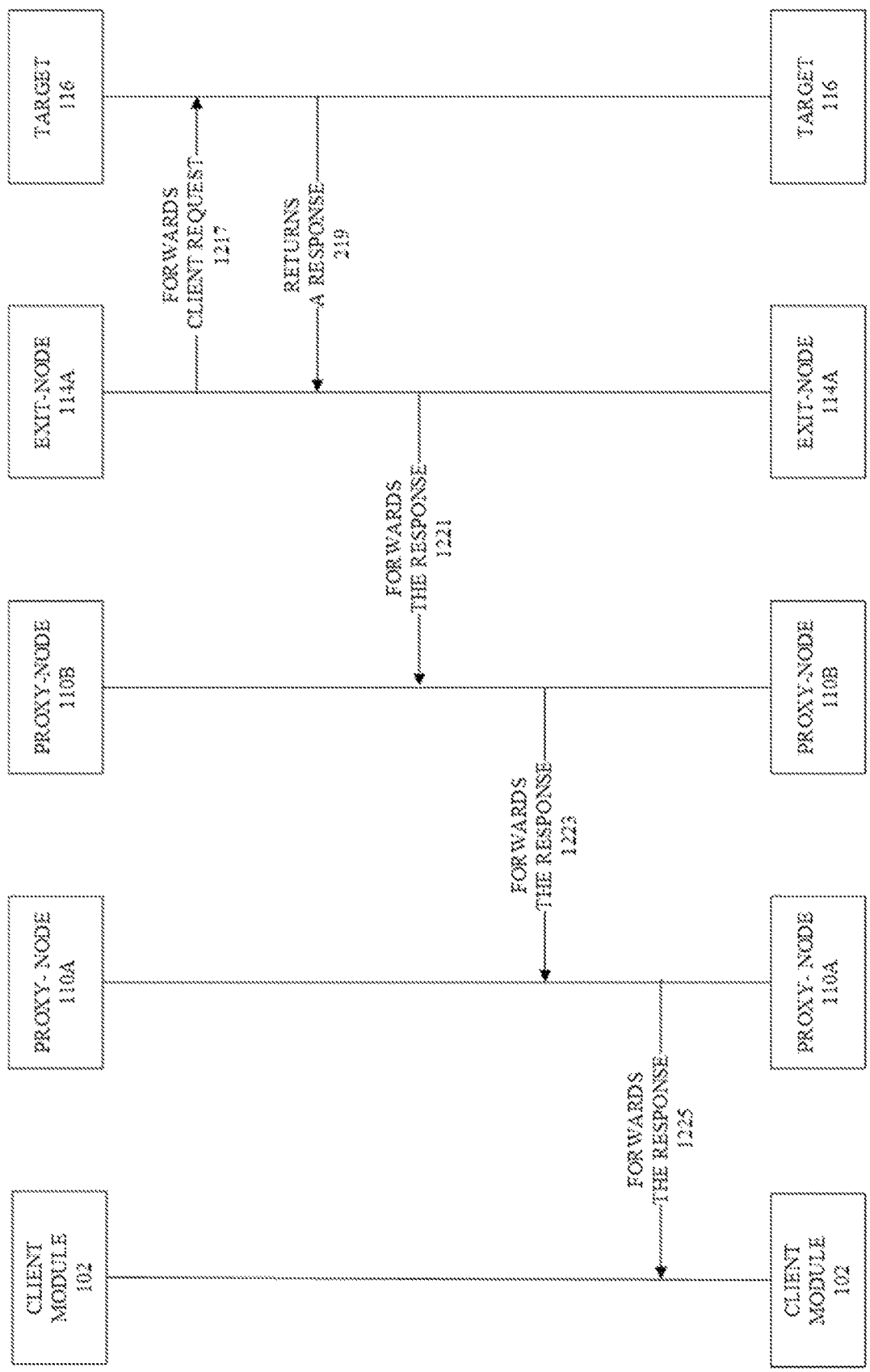

FIGS. 12A-12B are exemplary flow sequence diagrams showing the routing of client requests by a proxy-node in case of lacking a network connection to an exit-node that satisfies the request parameters. In the current exemplary flow sequence diagram, client module 102 has been already connected to proxy-node 110A in accordance with at least one of the three methods described in relation to FIG. 8, FIG. 9 and FIG. 10. Therefore, the flow sequence diagram of FIG. 12A begins with step 1201, where client module 102 sends a client request to proxy-node 110A via network 118. In the current example, client module 102 also sends a set of request parameters along with the client request. Here, request parameters are a set of specifications put forth by the client, such as, but not limited to, exit-node geo-location, browser preference, and exit-node operating system. In short, request parameters reflect the preferences of the client. Likewise, the client request may be, but not limited to, a web request, and/or search query and/or data/service request intended for target 116. Typically, the client request may include but not limited to a target URL (e.g., URL of target 116).

Proxy-node 110A, in step 1203, proceeds to evaluate the request parameters after receiving the client request and request parameters from client module 102. Subsequently, proxy-node 110A searches a plurality of exit-node metadata, specifically, the metadata of exit-nodes that are connected to it (i.e., to proxy-node 110A). In step 1205, proxy-node 110A determines the lack of network connection with an exit-node that satisfies the request parameters. In short, proxy-node 110A realizes that it lacks a network connection to a suitable exit-node in order to service the client request. In step 1207, proxy-node 110A searches a plurality of proxy-node metadata and finds a subsequent proxy-node connected to a suitable exit-node. In step 1209, proxy-node 110A forwards the client request and request parameters to the subsequent proxy-node connected to the suitable exit-node. In the current example, proxy-node 110B represents the subsequent proxy-node connected to a suitable exit-node. Therefore, proxy-node 110A forwards the client request and request parameters to proxy-node 110B (shown in step 1209). In step 1211, proxy-node 110B evaluates the request parameters. Subsequently, proxy-node 110B searches a plurality of exit-nodes metadata, specifically, the metadata of exit-nodes that are connected to proxy-node 110B. In step 1213, proxy-node 110B finds an exit-node that satisfies the request parameters from among the several exit-nodes connected to it (i.e., to proxy-node 110B). Following this, in step 1215, proxy-node 110B forwards the client request to the suitable exit-node. In the current example, exit-node 114A represents the suitable exit-node connected to proxy-node 110B. Therefore, in step 1215, proxy-node 110B forwards the client request to exit-node 114A.

In step 1217, exit-node 114A receives the client request and forwards the client request to target 116 via network 118. In step 1219, target 116 returns a response to the client request to exit-node 114A via network 118. In step 1221, exit-node 114A receives the response from target 116 and forwards the response to proxy-node 110B, which in turn, in step 1223, forwards the response to proxy-node 110A. Finally, in step 1225, proxy-node 110A receives the response (originated from target 116) from proxy-node 110B and forwards it (i.e., the response) to client module 102 via network 118. In this way, a client request is serviced by a proxy-node that may not have a suitable exit-node connected to it.

Figure 13A:
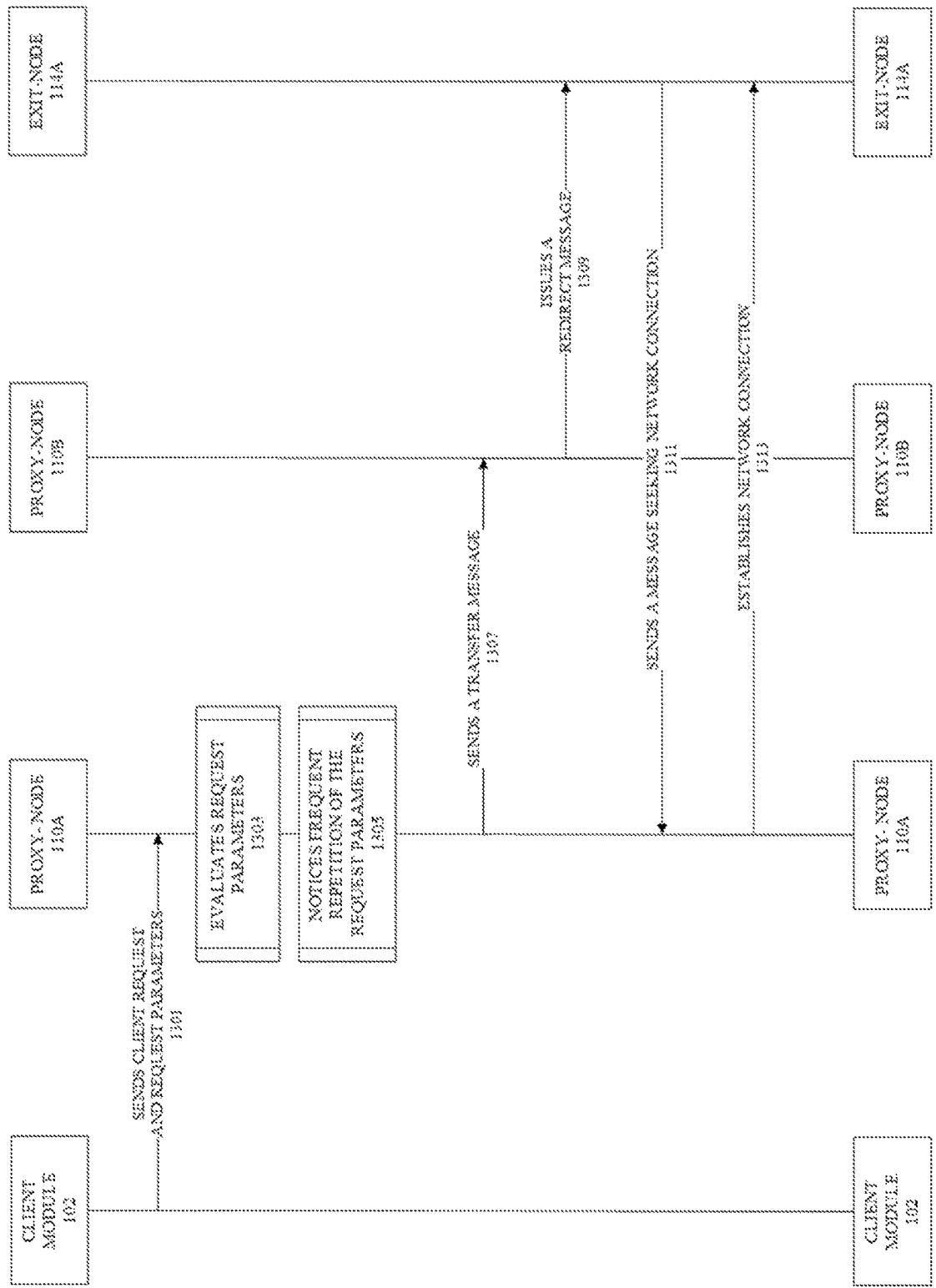
FIGS. 13A-13B are exemplary flow sequence diagrams showing how a proxy-node sending a transfer message to a subsequent proxy-node while routing the network traffic originated from a client module 102.
Figure 13B:
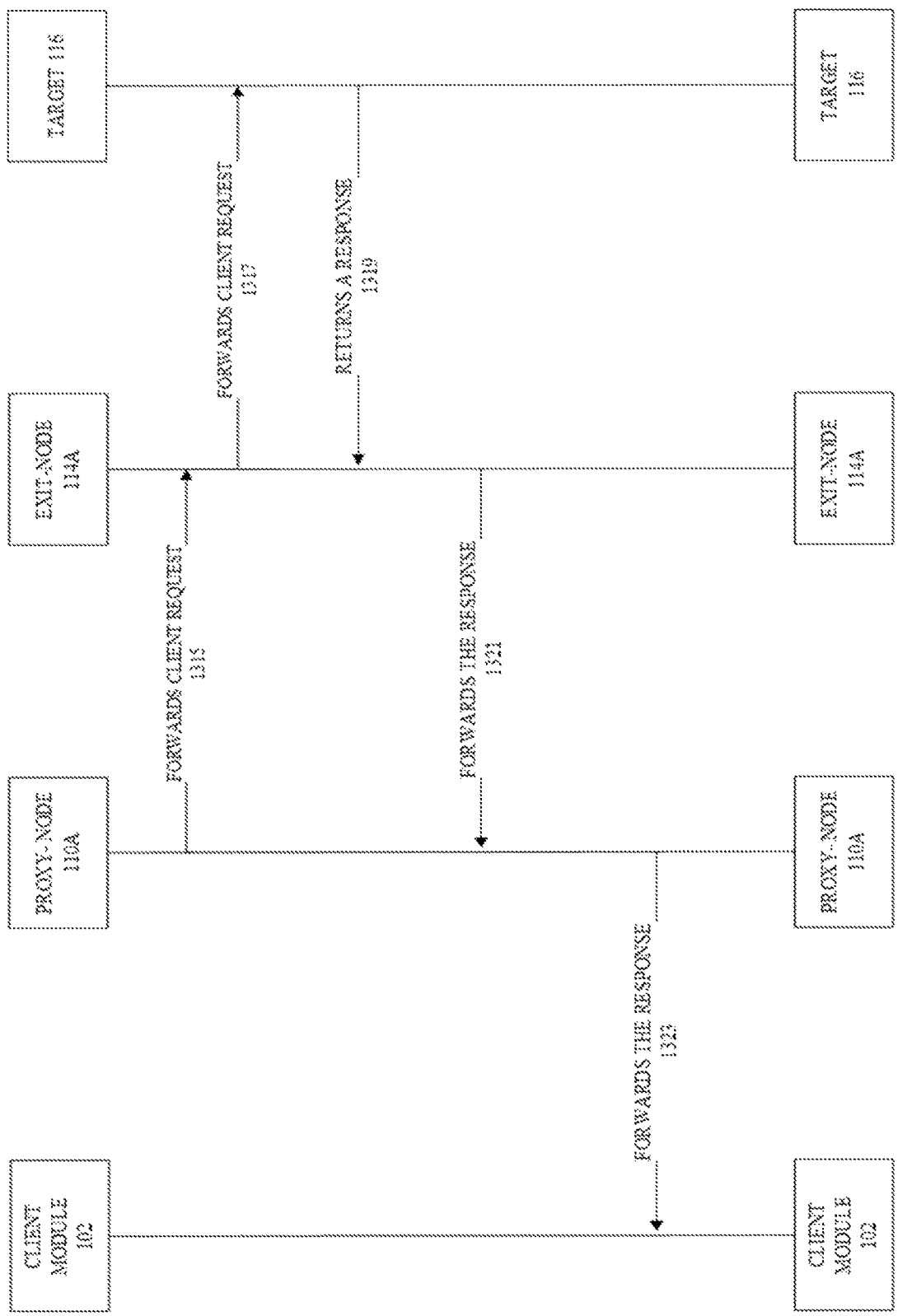

FIG. 13A-13B are exemplary flow sequence diagrams showing how a proxy-node sending a transfer message to a subsequent proxy-node while routing the network traffic originated from a client module 102. In the current exemplary flow sequence diagram, client module 102 has been already connected to proxy-node 110A in accordance with at least one of the three methods shown and described in FIG. 8, FIG. 9 and FIG. 10. Therefore, the flow sequence diagram of FIG. 12A begins with step 1301, where client module 102 sends a client request to proxy-node 110A via network 118. In the current example, client module 102 also sends a set of request parameters along with the client request. Here, request parameters are a set of specifications put forth by the client, such as, but not limited to, exit-node geo-location, browser preference, and exit-node operating system. In short, request parameters reflect the preferences of the client. Likewise, the client request may be, but not limited to, a web request, and/or search query and/or data/service request intended for target 116. Typically, the client request may include but not limited to a target URL (e.g., URL of target 116).

Proxy-node 110A, in step 1303, proceeds to evaluate the request parameters after receiving the client request and request parameters from client module 102. Subsequently, in step 1305, proxy-node 110A notices that the particular request parameters are repeatedly accompanied with client requests originating from client module 102. Further, the proxy-node 110A notices that the client requests accompanied with the particular requests parameters are frequently serviced and/or forwarded to a specific exit-node via a subsequent proxy-node. In step 1307, proxy-node 110A sends a transfer message to the subsequent proxy-node connected to the specific exit-node that frequently services the client requests originating from client module 102. In the current example, proxy-node 110B represents the subsequent proxy-node. Therefore, proxy-node 110A sends the transfer message to proxy-node 110B in step 1307. Furthermore, exit-node 114A represents the specific exit-node that frequently services the client requests originating from client module 102. The aforementioned transfer message informs proxy-node 110B to redirect the exit-node 114A to connect to proxy-node 110A, so that proxy-node 110A can service the client request, instead of forwarding the client request to proxy-node 110B.

Therefore, in step 1309, proxy-node 110B, in response to the transfer message, issues a redirect message to exit-node 114A. The redirect message instructs exit-node 114A to approach proxy-node 110A for a network connection. Further, the redirect message may, among other things, be the IP address of proxy-node 110A. In step 1311, exit-node 114A receives the redirect message from proxy-node 110B and approaches proxy-node 110A for a network connection. In step 1313, proxy-node 110A establishes the network connection with exit-node 114A.

In step 1315, proxy-node 110A forwards the client request to exit-node 114A, which in step 1317, forwards the client request to target 116 via network 118. After which, in step 1319, target 116, in response to the client request, returns a response to exit-node 114A via network 118. In step 1321, exit-node 114A forward the response to proxy-node 110A, which ultimately, in step 1323, forward the response to client module 102. In this way, a proxy-node services the client request in case of noticing that the client regularly prefers a specific exit-node.

Figure 14:
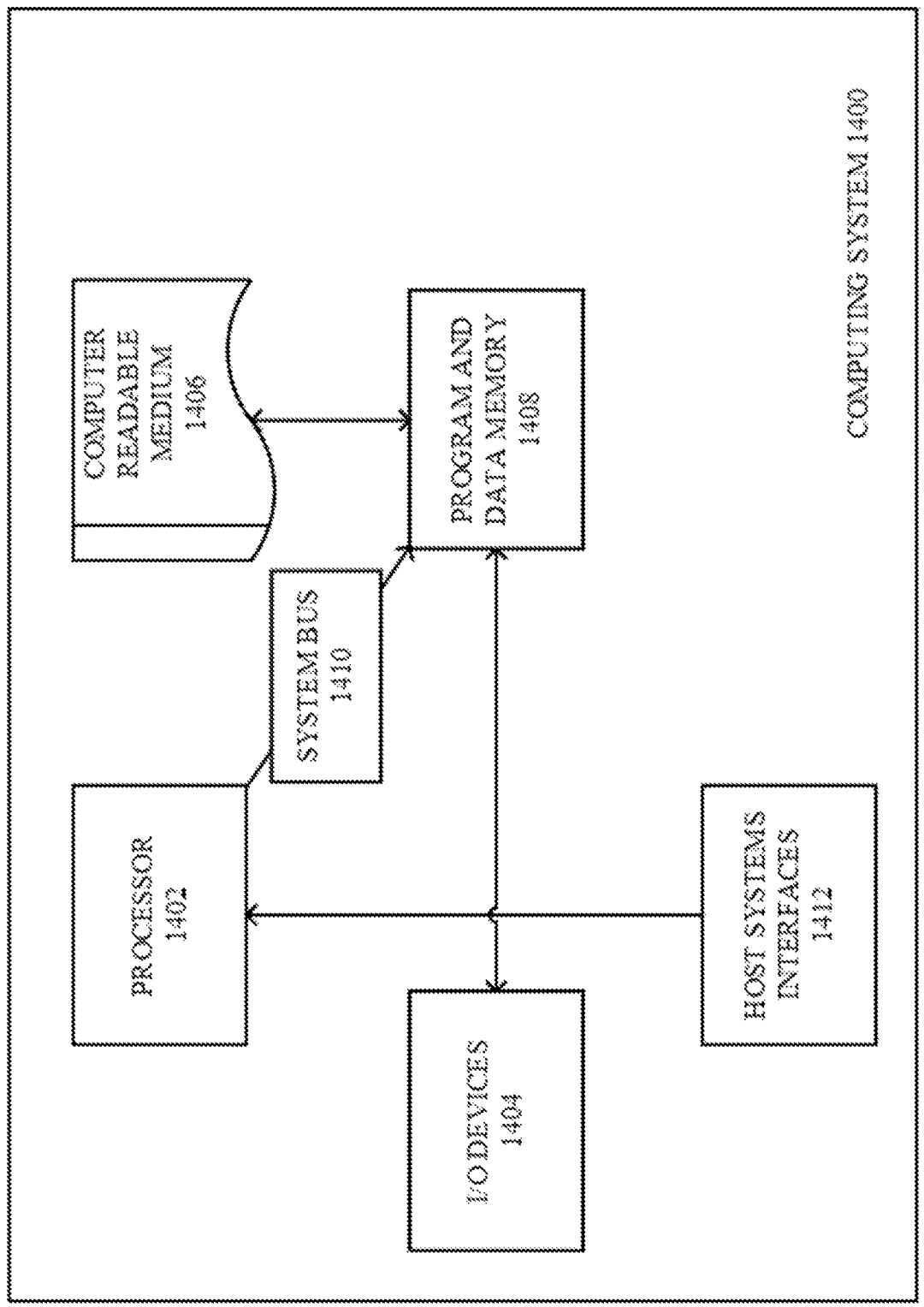
FIG. 14 illustrates a computing system 1400 in which a computer-readable medium 1403 may provide instruction for performing any methods and processes disclosed herein.

The embodiments herein may be combined or collocated in a variety of alternate ways due to design choice. Accordingly, the features and aspects herein are not in any way intended to be limited to any particular embodiment. Furthermore, one must be aware that the embodiments can take the form of hardware, firmware, software, and/or combinations thereof. In one embodiment, such software includes but not limited to firmware, resident software, microcode, etc. FIG. 14 illustrates a computing system 1400 in which a computer-readable medium 1406 may provide instruction for performing any methods and processes disclosed herein.

Furthermore, some aspects of the embodiments herein can take the form of a computer program product accessible from the computer-readable medium 1406 to provide program code for use by or in connection with a computer or any instruction execution system. For the purposes of this description, the computer-readable medium 1406 can be any apparatus that can tangibly store the program code for use by or in connection with the instruction execution system, apparatus, or device, including the computing system 1400.

The computer-readable medium 1406 can be any tangible electronic, magnetic, optical, electromagnetic, infrared, or semiconductor system (or apparatus or device). Some examples of a computer-readable medium 1406 include solid-state memories, magnetic tapes, removable computer diskettes, random access memories (RAM), read-only memories (ROM), magnetic disks, and optical disks. Some examples of optical disks include read-only compact disks (CD-ROM), read/write compact disks (CD-R/W), and digital versatile disks (DVD).

The computing system 1400 can include one or more processors 1402 coupled directly or indirectly to memory 1408 through a system bus 1410. The memory 1408 can include local memory employed during actual execution of the program code, bulk storage, and/or cache memories, which provide temporary storage of at least some of the program code in order to reduce the number of times the code is retrieved from bulk storage during execution.

Input/output (I/O) devices 1404 (including but not limited to keyboards, displays, pointing devices, I/O interfaces, etc.) can be coupled to the computing system 1400 either directly or through intervening I/O controllers. Network adapters may also be coupled to the computing system 1400 to enable the computing system 1400 to couple to other data processing systems, such as through host systems interfaces 1412, printers, and/or storage devices through intervening private or public networks. Modems, cable modems, and Ethernet cards are just examples of network adapter types.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential feature or element of any or all the claims. The invention is defined solely by the appended claims including any amendments made during the pendency of this application and all equivalents of those claims as issued.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way but may also be configured in ways that are not listed. For the indication of elements, singular or plural form can be used, but it does not limit the scope of the disclosure and the same teaching can apply to multiple objects, even if in the current application an object is referred to in its singular form.

The disclosure is provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, the inventive subject matter lies in less than all features of a single disclosed embodiment.

What is claimed:

1. A method for coordinating network connections and traffic in a proxy service infrastructure comprising:
    selecting, by a DNS server present within the proxy service infrastructure, an IP address of a proxy server, wherein the proxy server is selected based on at least one of the following: (i) geographical proximity to a client module, (ii) conforming to a client's prerequisites, or (iii) deemed to be appropriate for the client's regular activities;
    receiving, by the proxy server, a client request and request parameters from the client module, wherein the client request is addressed to a target;
    evaluating, by the proxy server, the request parameters received from the client module to determine whether the proxy server is connected to a suitable edge proxy satisfying the request parameters;

when the proxy server is determined to be connected to the suitable edge proxy, forwarding, by the proxy server, the client request to the suitable edge proxy;

when the proxy server is determined not to be connected to the suitable edge proxy:
  (i) identifying, by the proxy server, a subsequent proxy server connected to the suitable edge proxy;
  (ii) forwarding, by the proxy server, the client request and request parameters to the subsequent proxy server for forwarding to the suitable edge proxy;

determining, by the proxy server, that client requests are frequently serviced through the suitable edge proxy via the subsequent proxy server; and when the client requests are determined to be frequently serviced by the suitable edge proxy via the subsequent proxy server, sending, by the proxy server, a transfer message to the subsequent proxy server, the transfer message instructing the suitable edge proxy to connect to the proxy server.

2. The method of claim 1, further comprising, prior to selecting the IP address of the proxy server, receiving, by the DNS server, a DNS query from the client module.

3. The method of claim 2, wherein the DNS query received by the DNS server from the client module comprises a query domain name of the proxy server, query type, query class, and the client's prerequisites.

4. The method of claim 1, wherein the proxy server is present within the proxy service infrastructure.

5. The method of claim 1, further comprising, upon finding the IP address of the proxy server, sending, by the DNS server, the IP address of the proxy server to the client module.

6. The method of claim 1, wherein the proxy server is selected based on the client's prerequisites and wherein the client's prerequisites are preconditions for the proxy server comprising at least one of: geo-location specifications, operation system configuration details, and information on browser type.

7. The method of claim 1, wherein the proxy server is selected based on being deemed to be appropriate for the client's regular activities, and wherein the client's regular activities comprise at least one or a combination of: client's regular security policies, information on client's frequently preferred service types, and data on client's frequently preferred proxy servers and edge proxies.

8. The method of claim 1, further comprising regularly fetching and storing messages comprising the client's regular activities within a DNS server's storage facilities.

9. The method of claim 1, further comprising regularly fetching and storing messages comprising metadata of multiple proxy servers within the DNS server's storage facilities.

10. The method of claim 1, wherein the suitable edge proxy forwards the client request to the target.

11. The method of claim 1, wherein the subsequent proxy server connected to the suitable edge proxy, upon receiving the client request and the request parameters from the proxy server, evaluates the request parameters, finds the suitable edge proxy, and forwards the client request to the suitable edge proxy.

12. The method of claim 1, wherein the subsequent proxy server connected to the suitable edge proxy, upon receiving the transfer message from the proxy server, issues a redirect message to the suitable edge proxy.

13. The method of claim 12, wherein the suitable edge proxy, upon receiving the redirect message from the subsequent proxy server, requests a network connection from the proxy server.

14. The method of claim 1, further comprising:
  sending, by the DNS server present within the proxy infrastructure, the IP address of the proxy server to an edge proxy;
  determining that the proxy server is experiencing one or more inoperability conditions: system overload, resource exhaustion, graceful shutdown, and erroneous connection with the edge proxy; and
  when the proxy server is determined to be experiencing the one or more inoperability conditions, issuing, by the proxy server, a redirect message to the edge proxy, wherein the redirect message instructs the edge proxy to connect to at least one of: an alternate proxy server, an active proxy server, and the suitable proxy server.

15. The method of claim 14, further comprising, receiving, by the DNS server, a DNS query from the edge proxy.

16. The method of claim 15, further comprising answering, by the DNS server, the DNS query received from the edge proxy based on at least one of: edge proxy's geo-location, proxy server metrics, and frequent preferences of proxy clients in a geographical region.

17. The method of claim 16, wherein the edge proxy receives the IP address of the proxy server sent by the DNS server.

18. The method of claim 17, wherein the edge proxy, upon receiving the IP address of the proxy server, approaches and connects to the proxy server.

19. The method of claim 14, wherein the edge proxy, upon receiving the redirect message from the proxy server, approaches and connects to at least one of: the alternate proxy server, the active proxy server, and the suitable proxy server.

20. The method of claim 19, wherein the proxy server terminates a network connection with the edge proxy, after the edge proxy is connected to at least one of: the alternate proxy server, and the active proxy server, the suitable proxy server.

21. The method of claim 14, wherein the alternate proxy server's geo-location is identical to the proxy server's geo-location.

22. The method of claim 14, wherein the active proxy server's geo-location is identical to the proxy server's geo-location.

23. The method of claim 14, wherein the suitable proxy server is geographically closer to the edge proxy.

* * * * *